US012810481B2

(12) United States Patent
Park et al.

(10) Patent No.: US 12,810,481 B2
(45) Date of Patent: Nov. 24, 2026

(54) POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD BASED ON A PREDICTIVE TREE

(71) Applicant: LG ELECTRONICS INC., Seoul (KR)

(72) Inventors: Yousun Park, Seoul (KR); Sejin Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 272 days.

(21) Appl. No.: 18/018,962

(22) PCT Filed: Jul. 26, 2021

(86) PCT No.: PCT/KR2021/009619
§ 371 (c)(1),
(2) Date: Aug. 4, 2023

(87) PCT Pub. No.: WO2022/025552
PCT Pub. Date: Feb. 3, 2022

(65) Prior Publication Data

US 2023/0394712 A1 Dec. 7, 2023

(30) Foreign Application Priority Data

Jul. 31, 2020 (KR) ........................ 10-2020-0096099

(51) Int. Cl.
*G06T 9/00* (2006.01)
*G06T 9/40* (2006.01)

(52) U.S. Cl.
CPC ................ *G06T 9/001* (2013.01); *G06T 9/40* (2013.01)

(58) Field of Classification Search
None
See application file for complete search history.

(56) References Cited

U.S. PATENT DOCUMENTS 12,307,725 B2 * 5/2025 Li ........................... G06T 9/004
2020/0153885 A1 * 5/2020 Lee ....................... G06T 15/005
(Continued)

FOREIGN PATENT DOCUMENTS

CA 3103196 A1 * 12/2019 ............... G06T 9/00
KR 1020190044629 A 4/2019
(Continued)

OTHER PUBLICATIONS

STIC Provided version of WO2021/095879 A1 (Year: 2019).*
(Continued)

*Primary Examiner* — Tyler W. Sullivan
(74) *Attorney, Agent, or Firm* — Bryan Cave Leighton Paisner LLP

(57) ABSTRACT

A point cloud data transmission method may include encoding geometry data of point cloud data based on a predictive tree for the geometry data, encoding attribute data of the point cloud data based on the predictive tree, and transmitting a bitstream containing the point cloud data. The bitstream includes information for representing a type for the predictive tree, information related to an order for the geometry data, information related to an azimuth for the geometry data, and information for representing a prediction method related to the attribute data.

4 Claims, 31 Drawing Sheets

(56) References Cited

U.S. PATENT DOCUMENTS

| | | | | |
|---|---|---|---|---|
| 2021/0104075 | A1* | 4/2021 | Mammou | G06T 9/001 |
| 2021/0329270 | A1* | 10/2021 | Yea | H04N 19/103 |
| 2022/0114763 | A1* | 4/2022 | Ray | G01S 17/08 |
| 2022/0383552 | A1* | 12/2022 | Hur | G06T 9/004 |

FOREIGN PATENT DOCUMENTS

| | | | | |
|---|---|---|---|---|
| WO | WO-2021095879 | A1 * | 5/2021 | G06T 9/001 |
| WO | WO-2021207502 | A1 * | 10/2021 | H04N 19/91 |

OTHER PUBLICATIONS

STIC Provided version of CA 3-103-196 A1 (Year: 2018).*

Khaled Mammou, et al., "G-PCC codec description v2", International Organisation for Standardisation Organisation Internationale De Normalisation ISO/IEC JTC1/SC29/WG11 Coding of Moving Pictures and Audio. ISO/IEC JTC1/SC29/WG11 N18189. Jan. 2019, Marrakech, MA.

David Flynn, et al., "G-PCC: Combined octree-predictive geometry coding", International Organisation for Standardisation Organisation Internationale De Normalisation ISO/IEC JTC1/SC29/WG11 Coding of Moving Pictures and Audio. ISO/IEC JCTC1/SC29/WG11 MPEG/m52519. Jan. 2020, Brussels, Belgium.

Zhenzhen Gao, et al., "[G-PCC][New proposal] Improved implementation of the Prediction and Lifting schemes", International Organisation for Standardisation Organisation Internationale De Normalisation ISO/IEC JTC1/SC29/WG11 Coding of Moving Pictures and Audio.ISO/IEC JTC1/SC29/WG11 MPEG2019/m51010. Oct. 2019, Geneva, CH.

Zhenzhen Gao, et al., "[G-PCC][New proposal] Predictive Geometry Coding.", International Organisation for Standardisation Organisation Internationale De Normalisation ISO/IEC JTC1/SC29/WG11 Coding of Moving Pictures and Audio. ISO/IEC JTC1/SC29/WG11 MPEG2019/m51012. Oct. 2019, Geneva, CH.

* cited by examiner

FIG. 23

| seq_parameter_set_rbsp( ) { | Descriptor |
|---|---|
| .... | |
| geometry_coding_type | ue(v) |
| coded_geometry_order_use_flag | u(1) |
| sorting_order | ue(v) |
| .... | |
| } | |

FIG. 24

| tile_parameter_set( ) { | Descriptor |
| --- | --- |
| num_tiles | ue(v) |
| for( i = 0; i < num_tiles; i++ ) { | |
| tile_bounding_box_offset_x[ i ] | se(v) |
| tile_bounding_box_offset_y[ i ] | se(v) |
| tile_bounding_box_offset_z[ i ] | se(v) |
| tile_bounding_box_scale_factor[ i ]<br>tile_bounding_box_size_width[ i ] | ue(v)<br>ue(v) |
| tile_bounding_box_size_height[ i ] | ue(v) |
| } | |
| predictive_tree_geometry_coding_flag | u(1) |
| if(predictive_tree_geometry_coding_flag) | |
| sorting_order | u(1) |
| use_root_prediction_mode0_flag<br>prediction_method | u(1)<br>ue(v) |
| } | |
| } | |

FIG. 25

| geometry_parameter_set( ) { | Descriptor |
|---|---|
| .... | ue(v) |
| geometry_coding_type | ue(v) |
| coded_geometry_order_use_flag | u(1) |
| sorting_order | ue(v) |
| .... | |
| } | |

FIG. 26

| attribute_parameter_set( ) { | Descriptor |
|---|---|
| .... | |
| attribute_layer_num | ue(v) |
| for (int i = 0; i < attribute_layer_num; i++) | |
| attribute_layer_refine_flag | u(1) |
| attribute_encode_type | u(1) |
| if(attribute_encode_type == 3) {<br>attribute_geometry_predictive_tree_use_flag | u(1)<br>u(1) |
| geomtry_predictive_mode_use_flag | u(1) |
| attribute_predictive_tree_generation_mode | u(1) |
| attribute_predictive_mode_grouping_flag | u(1) |
| } | |
| .... | |
| } | |

FIG. 27

| geometry_slice_header( ) { | Descriptor |
|---|---|
| .... | |
| geometry_coding_type | ue(v) |
| coded_geometry_order_use_flag | u(1) |
| sorting_order | ue(v) |
| .... | |
| } | |

POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD BASED ON A PREDICTIVE TREE

CROSS-REFERENCE TO RELATED APPLICATIONS

This application is the National Stage filing under 35 U.S.C. 371 of International Application No. PCT/KR2021/009619, filed on Jul. 26, 2021, which claims the benefit of earlier filing date and right of priority to Korean Application No. 10-2020-0096099, filed on Jul. 31, 2020, the contents of which are all hereby incorporated by reference herein in their entirety.

TECHNICAL FIELD

Embodiments relate to a method and device for processing point cloud content.

BACKGROUND ART

Point cloud content is content represented by a point cloud, which is a set of points belonging to a coordinate system representing a three-dimensional space. The point cloud content may express media configured in three dimensions, and is used to provide various services such as virtual reality (VR), augmented reality (AR), mixed reality (MR), and self-driving services. However, tens of thousands to hundreds of thousands of point data are required to represent point cloud content. Therefore, there is a need for a method for efficiently processing a large amount of point data.

DISCLOSURE

Technical Problem

Embodiments provide a device and method for efficiently processing point cloud data. Embodiments provide a point cloud data processing method and device for addressing latency and encoding/decoding complexity.

The technical scope of the embodiments is not limited to the aforementioned technical objects, and may be extended to other technical objects that may be inferred by those skilled in the art based on the entire contents disclosed herein.

Technical Solution

To achieve these objects and other advantages and in accordance with the purpose of the disclosure, as embodied and broadly described herein, a method of transmitting point cloud data may include encoding point cloud data, and transmitting a bitstream containing the point cloud data. In another aspect of the present disclosure, a method of receiving point cloud data may include receiving a bitstream containing point cloud data, and decoding the point cloud data.

Advantageous Effects

Devices and methods according to embodiments may process point cloud data with high efficiency.

The devices and methods according to the embodiments may provide a high-quality point cloud service.

The devices and methods according to the embodiments may provide point cloud content for providing general-purpose services such as a VR service and a self-driving service.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. For a better understanding of various embodiments described below, reference should be made to the description of the following embodiments in connection with the accompanying drawings. The same reference numbers will be used throughout the drawings to refer to the same or like parts. In the drawings:

FIG. 23 shows an example of a syntax of a sequence parameter set according to embodiments;

FIG. 24 shows an example of a syntax of a tile parameter set according to embodiments;

FIG. 25 shows an example of a syntax of a geometry parameter set according to embodiments;

FIG. 26 shows an example of a syntax of an attribute parameter set according to embodiments;

FIG. 27 shows an example of a syntax of a slice header of a geometry bitstream according to embodiments;

BEST MODE

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that may be implemented according to the present disclosure. The following detailed description includes specific details in order to provide a thorough understanding of the present disclosure. However, it will be apparent to those skilled in the art that the present disclosure may be practiced without such specific details.

Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings.

Figure 1:
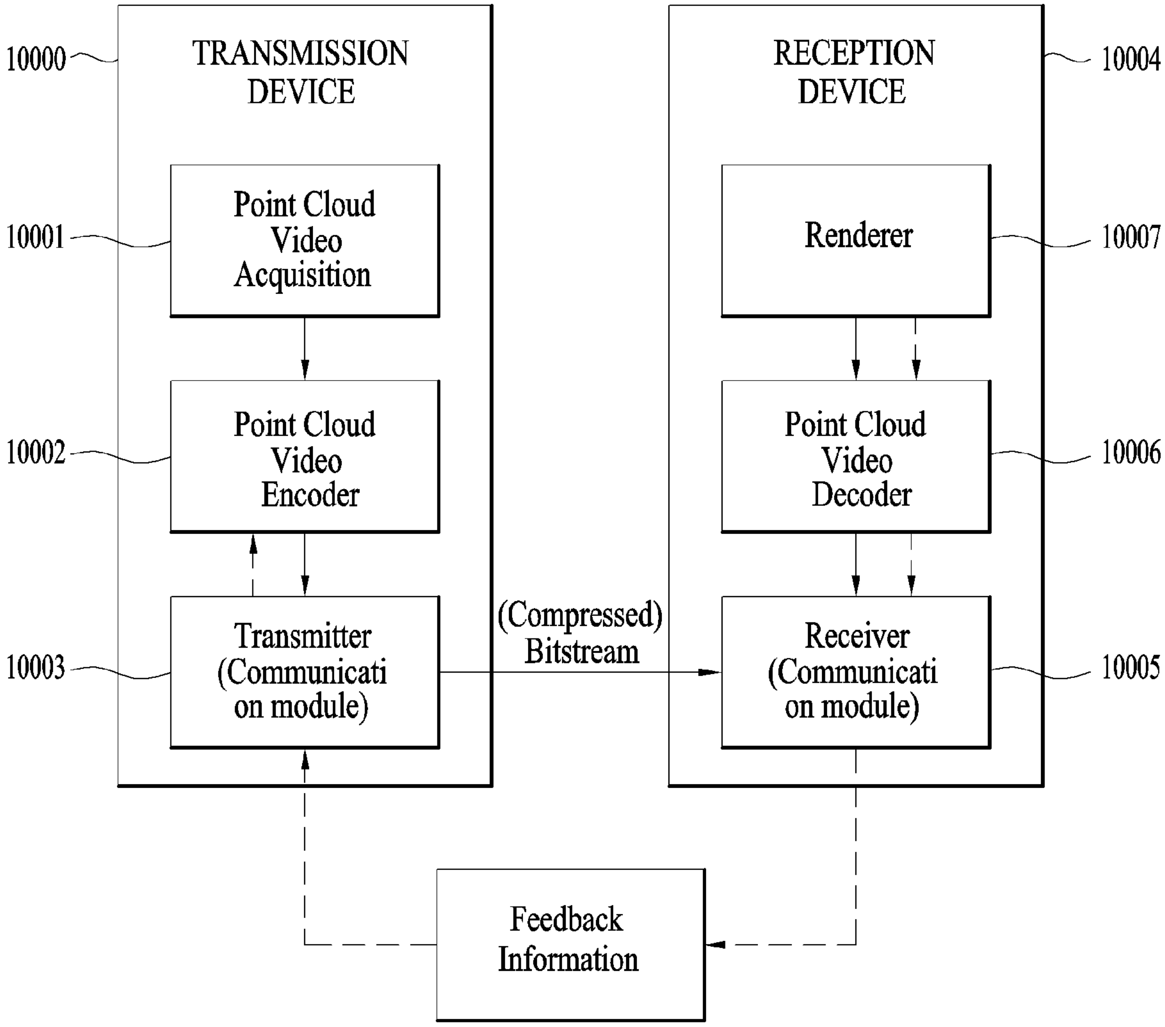
FIG. 1 shows an exemplary point cloud content providing system according to embodiments.

FIG. 1 shows an exemplary point cloud content providing system according to embodiments.

The point cloud content providing system illustrated in FIG. 1 may include a transmission device 10000 and a reception device 10004. The transmission device 10000 and the reception device 10004 are capable of wired or wireless communication to transmit and receive point cloud data.

The point cloud data transmission device 10000 according to the embodiments may secure and process point cloud video (or point cloud content) and transmit the same. According to embodiments, the transmission device 10000 may include a fixed station, a base transceiver system (BTS), a network, an artificial intelligence (AI) device and/or system, a robot, an AR/VR/XR device and/or server. According to embodiments, the transmission device 10000 may include a device, a robot, a vehicle, an AR/VR/XR device, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The transmission device 10000 according to the embodiments includes a point cloud video acquirer 10001, a point cloud video encoder 10002, and/or a transmitter (or communication module) 10003.

The point cloud video acquirer 10001 according to the embodiments acquires a point cloud video through a processing process such as capture, synthesis, or generation. The point cloud video is point cloud content represented by a point cloud, which is a set of points positioned in a 3D space, and may be referred to as point cloud video data, point cloud data, etc. The point cloud video according to the embodiments may include one or more frames. One frame represents a still image/picture. Therefore, the point cloud video may include a point cloud image/frame/picture, and may be referred to as a point cloud image, frame, or picture.

The point cloud video encoder 10002 according to the embodiments encodes the acquired point cloud video data. The point cloud video encoder 10002 may encode the point cloud video data based on point cloud compression coding. The point cloud compression coding according to the embodiments may include geometry-based point cloud compression (G-PCC) coding and/or video-based point cloud compression (V-PCC) coding or next-generation coding. The point cloud compression coding according to the embodiments is not limited to the above-described embodiment. The point cloud video encoder 10002 may output a bitstream containing the encoded point cloud video data. The bitstream may contain not only the encoded point cloud video data, but also signaling information related to encoding of the point cloud video data.

The transmitter 10003 according to the embodiments transmits the bitstream containing the encoded point cloud video data. The bitstream according to the embodiments is encapsulated in a file or segment (e.g., a streaming segment), and is transmitted over various networks such as a broadcasting network and/or a broadband network. Although not shown in the figure, the transmission device 10000 may include an encapsulator (or an encapsulation module) configured to perform an encapsulation operation. According to embodiments, the encapsulator may be included in the transmitter 10003. According to embodiments, the file or segment may be transmitted to the reception device 10004 over a network, or stored in a digital storage medium (e.g., USB, SD, CD, DVD, Blu-ray, HDD, SSD, etc.). The transmitter 10003 according to the embodiments is capable of wired/wireless communication with the reception device 10004 (or the receiver 10005) over a network of 4G, 5G, 6G, etc. In addition, the transmitter may perform a necessary data processing operation according to the network system (e.g., a 4G, 5G or 6G communication network system). The transmission device 10000 may transmit the encapsulated data in an on-demand manner.

The reception device 10004 according to the embodiments includes a receiver 10005, a point cloud video decoder 10006, and/or a renderer 10007. According to embodiments, the reception device 10004 may include a device, a robot, a vehicle, an AR/VR/XR device, a portable device, a home appliance, an Internet of Things (IoT) device, and an AI device/server which are configured to perform communication with a base station and/or other wireless devices using a radio access technology (e.g., 5G New RAT (NR), Long Term Evolution (LTE)).

The receiver 10005 according to the embodiments receives the bitstream containing the point cloud video data or the file/segment in which the bitstream is encapsulated from the network or storage medium. The receiver 10005 may perform necessary data processing according to the network system (e.g., a communication network system of 4G, 5G, 6G, etc.). The receiver 10005 according to the embodiments may decapsulate the received file/segment and output a bitstream. According to embodiments, the receiver 10005 may include a decapsulator (or a decapsulation module) configured to perform a decapsulation operation. The decapsulator may be implemented as an element (or component) separate from the receiver 10005.

The point cloud video decoder 10006 decodes the bitstream containing the point cloud video data. The point cloud video decoder 10006 may decode the point cloud video data according to the method by which the point cloud video data is encoded (for example, in a reverse process of the operation of the point cloud video encoder 10002). Accordingly, the point cloud video decoder 10006 may decode the point cloud video data by performing point cloud decompression coding, which is the inverse process of the point cloud compression. The point cloud decompression coding includes G-PCC coding.

The renderer 10007 renders the decoded point cloud video data. The renderer 10007 may output point cloud content by rendering not only the point cloud video data but also audio data. According to embodiments, the renderer 10007 may include a display configured to display the point cloud content. According to embodiments, the display may be implemented as a separate device or component rather than being included in the renderer 10007.

The arrows indicated by dotted lines in the drawing represent a transmission path of feedback information acquired by the reception device 10004. The feedback information is information for reflecting interactivity with a user who consumes the point cloud content, and includes information about the user (e.g., head orientation information, viewport information, and the like). In particular, when the point cloud content is content for a service (e.g., self-driving service, etc.) that requires interaction with the user, the feedback information may be provided to the content transmitting side (e.g., the transmission device 10000) and/or the service provider. According to embodiments, the feedback information may be used in the reception device 10004 as well as the transmission device 10000, or may not be provided.

The head orientation information according to embodiments is information about the user's head position, orientation, angle, motion, and the like. The reception device 10004 according to the embodiments may calculate the viewport information based on the head orientation information. The viewport information may be information about a region of a point cloud video that the user is viewing. A viewpoint is a point through which the user is viewing the point cloud video, and may refer to a center point of the viewport region. That is, the viewport is a region centered on the viewpoint, and the size and shape of the region may be determined by a field of view (FOV). Accordingly, the reception device 10004 may extract the viewport information based on a vertical or horizontal FOV supported by the device in addition to the head orientation information. Also, the reception device 10004 performs gaze analysis or the like to check the way the user consumes a point cloud, a region that the user gazes at in the point cloud video, a gaze time, and the like. According to embodiments, the reception device 10004 may transmit feedback information including the result of the gaze analysis to the transmission device 10000. The feedback information according to the embodiments may be acquired in the rendering and/or display process. The feedback information according to the embodiments may be secured by one or more sensors included in the reception device 10004. According to embodiments, the feedback information may be secured by the renderer 10007 or a separate external element (or device, component, or the like). The dotted lines in FIG. 1 represent a process of transmitting the feedback information secured by the renderer 10007. The point cloud content providing system may process (encode/decode) point cloud data based on the feedback information. Accordingly, the point cloud video data decoder 10006 may perform a decoding operation based on the feedback information. The reception device 10004 may transmit the feedback information to the transmission device 10000. The transmission device 10000 (or the point cloud video data encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) the entire point cloud data, and provide point cloud content to the user.

According to embodiments, the transmission device 10000 may be called an encoder, a transmission device, a transmitter, or the like, and the reception device 10004 may be called a decoder, a receiving device, a receiver, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to the point cloud data.

The elements of the point cloud content providing system illustrated in FIG. 1 may be implemented by hardware, software, a processor, and/or a combination thereof.

Figure 2:
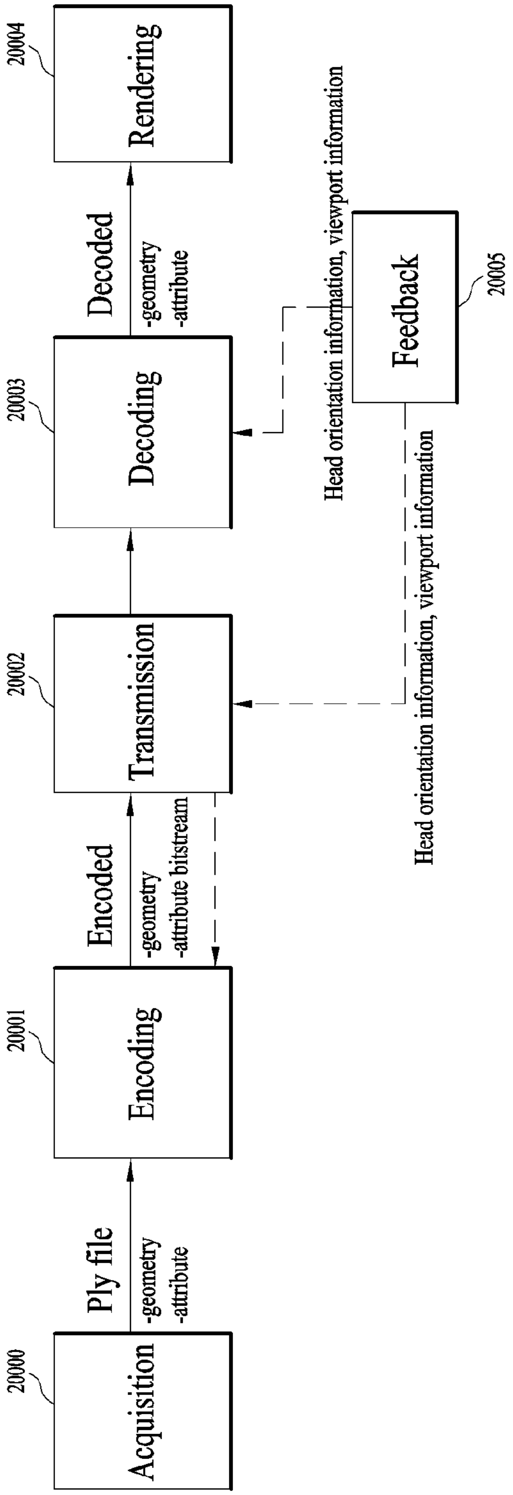
FIG. 2 is a block diagram illustrating a point cloud content providing operation according to embodiments.

FIG. 2 is a block diagram illustrating a point cloud content providing operation according to embodiments.

The block diagram of FIG. 2 shows the operation of the point cloud content providing system described in FIG. 1. As described above, the point cloud content providing system may process point cloud data based on point cloud compression coding (e.g., G-PCC).

The point cloud content providing system according to the embodiments (e.g., the point cloud transmission device 10000 or the point cloud video acquirer 10001) may acquire a point cloud video (20000). The point cloud video is represented by a point cloud belonging to a coordinate system for expressing a 3D space. The point cloud video according to the embodiments may include a Ply (Polygon File format or the Stanford Triangle format) file. When the point cloud video has one or more frames, the acquired point cloud video may include one or more Ply files. The Ply files contain point cloud data, such as point geometry and/or attributes. The geometry includes positions of points. The position of each point may be represented by parameters (e.g., values of the X, Y, and Z axes) representing a three-dimensional coordinate system (e.g., a coordinate system composed of X, Y and Z axes). The attributes include attributes of points (e.g., information about texture, color (in YCbCr or RGB), reflectance r, transparency, etc. of each point). A point has one or more attributes. For example, a point may have an attribute that is a color, or two attributes that are color and reflectance. According to embodiments, the geometry may be called positions, geometry information, geometry data, position information, position data or the like, and the attribute may be called attributes, attribute information, attribute data, or the like. The point cloud content providing system (e.g., the point cloud transmission device 10000 or the point cloud video acquirer 10001) may secure point cloud data from information (e.g., depth information, color information, etc.) related to the acquisition process of the point cloud video.

The point cloud content providing system (e.g., the transmission device 10000 or the point cloud video encoder 10002) according to the embodiments may encode the point cloud data (20001). The point cloud content providing system may encode the point cloud data based on point cloud compression coding. As described above, the point cloud data may include the geometry and attributes of a point. Accordingly, the point cloud content providing system may perform geometry encoding of encoding the geometry and output a geometry bitstream. The point cloud content providing system may perform attribute encoding of encoding attributes and output an attribute bitstream. According to embodiments, the point cloud content providing system may perform the attribute encoding based on the geometry encoding. The geometry bitstream and the attribute bitstream according to the embodiments may be multiplexed and output as one bitstream. The bitstream according to the embodiments may further contain signaling information related to the geometry encoding and attribute encoding.

The point cloud content providing system (for example, the transmission device 10000 or the transmitter 10003) according to the embodiments may transmit the encoded point cloud data (20002). As illustrated in FIG. 1, the encoded point cloud data may be represented by a geometry bitstream and an attribute bitstream. In addition, the encoded point cloud data may be transmitted in the form of a bitstream together with signaling information related to encoding of the point cloud data (e.g., signaling information related to the geometry encoding and the attribute encoding). The point cloud content providing system may encapsulate a bitstream that carries the encoded point cloud data and transmit the same in the form of a file or segment.

The point cloud content providing system (e.g., the reception device 10004 or the receiver 10005) according to the embodiments may receive the bitstream containing the encoded point cloud data. In addition, the point cloud content providing system (e.g., the reception device 10004 or the receiver 10005) may demultiplex the bitstream.

The point cloud content providing system (e.g., the reception device 10004 or the point cloud video decoder 10005) may decode the encoded point cloud data (e.g., the geometry bitstream, the attribute bitstream) transmitted in the bitstream. The point cloud content providing system (e.g., the reception device 10004 or the point cloud video decoder 10005) may decode the point cloud video data based on the signaling information related to encoding of the point cloud video data contained in the bitstream. The point cloud content providing system (e.g., the reception device 10004 or the point cloud video decoder 10005) may decode the geometry bitstream to reconstruct the positions (geometry) of points. The point cloud content providing system may reconstruct the attributes of the points by decoding the attribute bitstream based on the reconstructed geometry. The point cloud content providing system (e.g., the reception device 10004 or the point cloud video decoder 10005) may reconstruct the point cloud video based on the positions according to the reconstructed geometry and the decoded attributes.

The point cloud content providing system according to the embodiments (e.g., the reception device 10004 or the renderer 10007) may render the decoded point cloud data (20004). The point cloud content providing system (e.g., the reception device 10004 or the renderer 10007) may render the geometry and attributes decoded through the decoding process, using various rendering methods. Points in the point cloud content may be rendered to a vertex having a certain thickness, a cube having a specific minimum size centered on the corresponding vertex position, or a circle centered on the corresponding vertex position. All or part of the rendered point cloud content is provided to the user through a display (e.g., a VR/AR display, a general display, etc.).

The point cloud content providing system (e.g., the reception device 10004) according to the embodiments may secure feedback information (20005). The point cloud content providing system may encode and/or decode point cloud data based on the feedback information. The feedback information and the operation of the point cloud content providing system according to the embodiments are the same as the feedback information and the operation described with reference to FIG. 1, and thus detailed description thereof is omitted.

Figure 3:
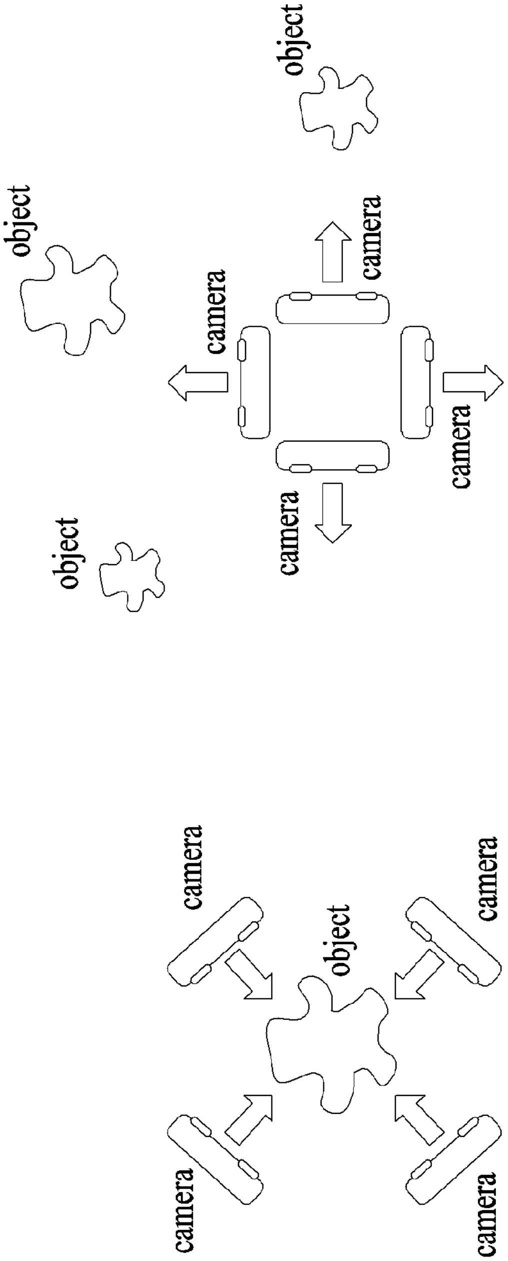
FIG. 3 illustrates an exemplary process of capturing a point cloud video according to embodiments.

FIG. 3 illustrates an exemplary process of capturing a point cloud video according to embodiments.

FIG. 3 illustrates an exemplary point cloud video capture process of the point cloud content providing system described with reference to FIGS. 1 to 2.

Point cloud content includes a point cloud video (images and/or videos) representing an object and/or environment located in various 3D spaces (e.g., a 3D space representing a real environment, a 3D space representing a virtual environment, etc.). Accordingly, the point cloud content providing system according to the embodiments may capture a point cloud video using one or more cameras (e.g., an infrared camera capable of securing depth information, an RGB camera capable of extracting color information corresponding to the depth information, etc.), a projector (e.g., an infrared pattern projector to secure depth information), a LiDAR, or the like. The point cloud content providing system according to the embodiments may extract the shape of geometry composed of points in a 3D space from the depth information and extract the attributes of each point from the color information to secure point cloud data. An image and/or video according to the embodiments may be captured based on at least one of the inward-facing technique and the outward-facing technique.

The left part of FIG. 3 illustrates the inward-facing technique. The inward-facing technique refers to a technique of capturing images a central object with one or more cameras (or camera sensors) positioned around the central object. The inward-facing technique may be used to generate point cloud content providing a 360-degree image of a key object to the user (e.g., VR/AR content providing a 360-degree image of an object (e.g., a key object such as a character, player, object, or actor) to the user).

The right part of FIG. 3 illustrates the outward-facing technique. The outward-facing technique refers to a technique of capturing images an environment of a central object rather than the central object with one or more cameras (or camera sensors) positioned around the central object. The outward-facing technique may be used to generate point cloud content for providing a surrounding environment that appears from the user's point of view (e.g., content representing an external environment that may be provided to a user of a self-driving vehicle).

As shown in the figure, the point cloud content may be generated based on the capturing operation of one or more cameras. In this case, the coordinate system may differ among the cameras, and accordingly the point cloud content providing system may calibrate one or more cameras to set a global coordinate system before the capturing operation. In addition, the point cloud content providing system may generate point cloud content by synthesizing an arbitrary image and/or video with an image and/or video captured by the above-described capture technique. The point cloud content providing system may not perform the capturing operation described in FIG. 3 when it generates point cloud content representing a virtual space. The point cloud content providing system according to the embodiments may perform post-processing on the captured image and/or video. In other words, the point cloud content providing system may remove an unwanted area (e.g., a background), recognize a space to which the captured images and/or videos are connected, and, when there is a spatial hole, perform an operation of filling the spatial hole.

The point cloud content providing system may generate one piece of point cloud content by performing coordinate transformation on points of the point cloud video secured from each camera. The point cloud content providing system may perform coordinate transformation on the points based on the coordinates of the position of each camera. Accordingly, the point cloud content providing system may generate content representing one wide range, or may generate point cloud content having a high density of points.

Figure 4:
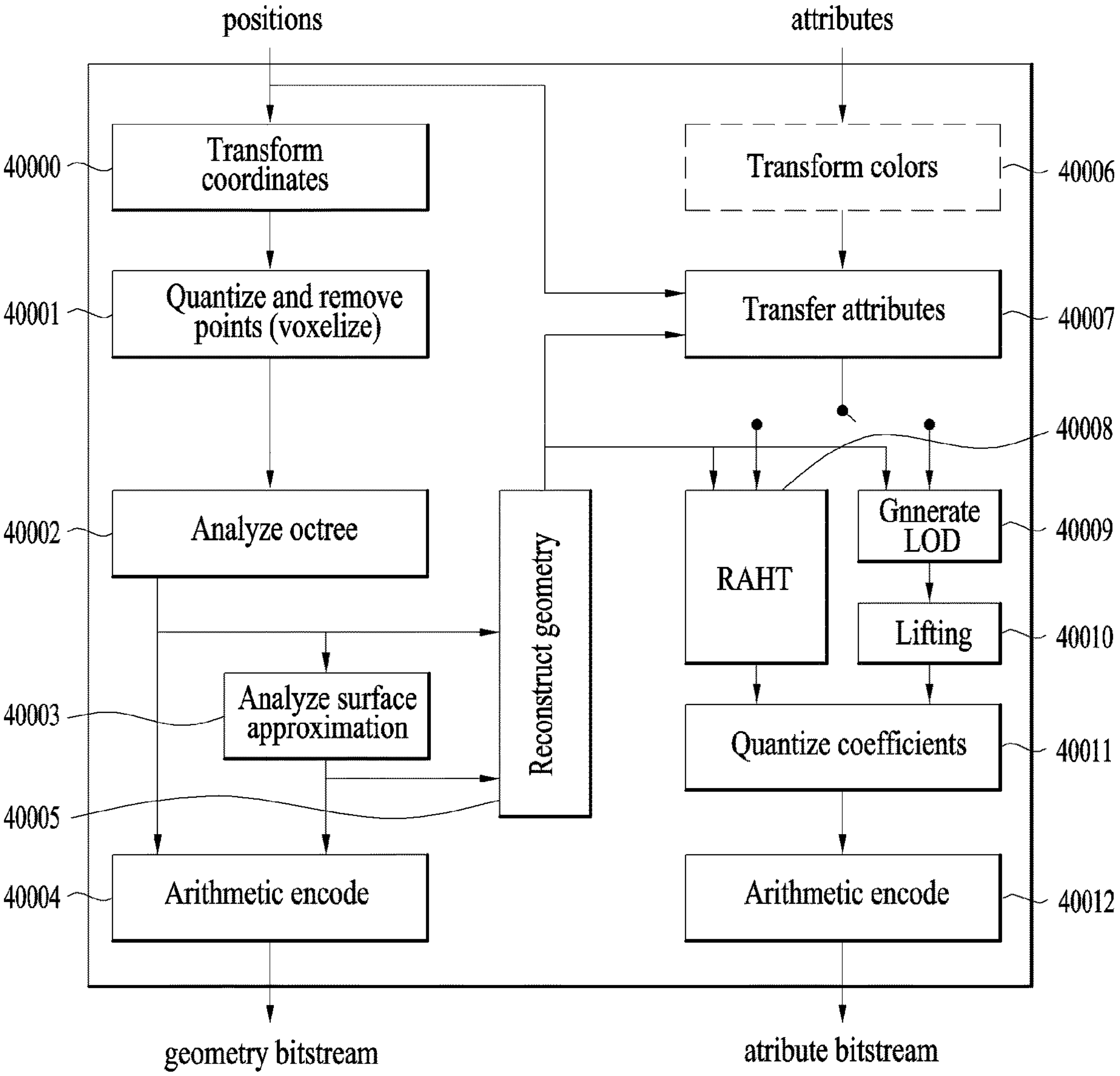
FIG. 4 illustrates an exemplary point cloud encoder according to embodiments.

FIG. 4 illustrates an exemplary point cloud encoder according to embodiments.

FIG. 4 shows an example of the point cloud video encoder 10002 of FIG. 1. The point cloud encoder reconstructs and encodes point cloud data (e.g., positions and/or attributes of the points) to adjust the quality of the point cloud content (to, for example, lossless, lossy, or near-lossless) according to the network condition or applications. When the overall size of the point cloud content is large (e.g., point cloud content of 60 Gbps is given for 30 fps), the point cloud content providing system may fail to stream the content in real time. Accordingly, the point cloud content providing system may reconstruct the point cloud content based on the maximum target bitrate to provide the same in accordance with the network environment or the like.

As described with reference to FIGS. 1 and 2, the point cloud encoder may perform geometry encoding and attribute encoding. The geometry encoding is performed before the attribute encoding.

The point cloud encoder according to the embodiments includes a coordinate transformer (Transform coordinates) 40000, a quantizer (Quantize and remove points (voxelize)) 40001, an octree analyzer (Analyze octree) 40002, and a surface approximation analyzer (Analyze surface approximation) 40003, an arithmetic encoder (Arithmetic encode) 40004, a geometry reconstructor (Reconstruct geometry) 40005, a color transformer (Transform colors) 40006, an attribute transformer (Transform attributes) 40007, a RAHT transformer (RAHT) 40008, an LOD generator (Generate LOD) 40009, a lifting transformer (Lifting) 40010, a coefficient quantizer (Quantize coefficients) 40011, and/or an arithmetic encoder (Arithmetic encode) 40012.

The coordinate transformer 40000, the quantizer 40001, the octree analyzer 40002, the surface approximation analyzer 40003, the arithmetic encoder 40004, and the geometry reconstructor 40005 may perform geometry encoding. The geometry encoding according to the embodiments may include octree geometry coding, predictive geometry coding, direct coding, trisoup geometry encoding, and entropy encoding. The direct coding and trisoup geometry encoding are applied selectively or in combination. The geometry encoding is not limited to the above-described example.

As shown in the figure, the coordinate transformer 40000 according to the embodiments receives positions and transforms the same into coordinates. For example, the positions may be transformed into position information in a three-dimensional space (e.g., a three-dimensional space represented by an XYZ coordinate system). The position information in the three-dimensional space according to the embodiments may be referred to as geometry information.

The quantizer 40001 according to the embodiments quantizes the geometry. For example, the quantizer 40001 may quantize the points based on a minimum position value of all points (e.g., a minimum value on each of the X, Y, and Z axes). The quantizer 40001 performs a quantization operation of multiplying the difference between the minimum position value and the position value of each point by a preset quantization scale value and then finding the nearest integer value by rounding the value obtained through the multiplication. Thus, one or more points may have the same quantized position (or position value). The quantizer 40001 according to the embodiments performs voxelization based on the quantized positions to reconstruct quantized points. As in the case of a pixel, which is the minimum unit containing 2D image/video information, points of point cloud content (or 3D point cloud video) according to the embodiments may be included in one or more voxels. The term voxel, which is a compound of volume and pixel, refers to a 3D cubic space generated when a 3D space is divided into units (unit=1.0) based on the axes representing the 3D space (e.g., X-axis, Y-axis, and Z-axis). The quantizer 40001 may match groups of points in the 3D space with voxels. According to embodiments, one voxel may include only one point. According to embodiments, one voxel may include one or more points. In order to express one voxel as one point, the position of the center of a voxel may be set based on the positions of one or more points included in the voxel. In this case, attributes of all positions included in one voxel may be combined and assigned to the voxel.

The octree analyzer 40002 according to the embodiments performs octree geometry coding (or octree coding) to present voxels in an octree structure. The octree structure represents points matched with voxels, based on the octal tree structure.

The surface approximation analyzer 40003 according to the embodiments may analyze and approximate the octree. The octree analysis and approximation according to the embodiments is a process of analyzing a region containing a plurality of points to efficiently provide octree and voxelization.

The arithmetic encoder 40004 according to the embodiments performs entropy encoding on the octree and/or the approximated octree. For example, the encoding scheme includes arithmetic encoding. As a result of the encoding, a geometry bitstream is generated.

The color transformer 40006, the attribute transformer 40007, the region adaptive hierarchical transform (RAHT) transformer 40008, the LOD generator 40009, the lifting transformer 40010, the coefficient quantizer 40011, and/or the arithmetic encoder 40012 perform attribute encoding. As described above, one point may have one or more attributes. The attribute encoding according to the embodiments is equally applied to the attributes that one point has. However, when an attribute (e.g., color) includes one or more elements, attribute encoding is independently applied to each element. The attribute encoding according to the embodiments includes color transform coding, attribute transform coding, region adaptive hierarchical transform (RAHT) coding, interpolation-based hierarchical nearest-neighbor prediction (predictive transform) coding, and interpolation-based hierarchical nearest-neighbor prediction with an update/lifting step (lifting transform) coding. Depending on the point cloud content, the RAHT coding, the predictive transform coding and the lifting transform coding described above may be selectively used, or a combination of one or more of the coding schemes may be used. The attribute encoding according to the embodiments is not limited to the above-described example.

The color transformer 40006 according to the embodiments performs color transform coding of transforming color values (or textures) included in the attributes. For example, the color transformer 40006 may transform the format of color information (for example, from RGB to YCbCr). The operation of the color transformer 40006 according to embodiments may be optionally applied according to the color values included in the attributes.

The geometry reconstructor 40005 according to the embodiments reconstructs (decompresses) the octree, the predictive tree and/or the approximated octree. The geometry reconstructor 40005 reconstructs the octree/voxels based on the result of analyzing the distribution of points. The reconstructed octree/voxels may be referred to as reconstructed geometry (restored geometry).

The attribute transformer 40007 according to the embodiments performs attribute transformation to transform the attributes based on the reconstructed geometry and/or the positions on which geometry encoding is not performed. As described above, since the attributes are dependent on the geometry, the attribute transformer 40007 may transform the attributes based on the reconstructed geometry information. For example, based on the position value of a point included in a voxel, the attribute transformer 40007 may transform the attribute of the point at the position. As described above, when the position of the center of a voxel is set based on the positions of one or more points included in the voxel, the attribute transformer 40007 transforms the attributes of the one or more points. When the trisoup geometry encoding is performed, the attribute transformer 40007 may transform the attributes based on the trisoup geometry encoding.

The attribute transformer 40007 may perform the attribute transformation by calculating the average of attributes or attribute values of neighboring points (e.g., color or reflectance of each point) within a specific position/radius from the position (or position value) of the center of each voxel. The attribute transformer 40007 may apply a weight according to the distance from the center to each point in calculating the average. Accordingly, each voxel has a position and a calculated attribute (or attribute value).

The attribute transformer 40007 may search for neighboring points existing within a specific position/radius from the position of the center of each voxel based on the K-D tree or the Morton code. The K-D tree is a binary search tree and supports a data structure capable of managing points based on the positions such that nearest neighbor search (NNS) can be performed quickly. The Morton code is generated by presenting coordinates (e.g., (x, y, z)) representing 3D positions of all points as bit values and mixing the bits. For example, when the coordinates representing the position of a point are (5, 9, 1), the bit values for the coordinates are (0101, 1001, 0001). Mixing the bit values according to the bit index in order of z, y, and x yields 010001000111. This value is expressed as a decimal number of 1095. That is, the Morton code value of the point having coordinates (5, 9, 1) is 1095. The attribute transformer 40007 may order the points based on the Morton code values and perform NNS through a depth-first traversal process. After the attribute transformation operation, the K-D tree or the Morton code is used when the NNS is needed in another transformation process for attribute coding.

As shown in the figure, the transformed attributes are input to the RAHT transformer 40008 and/or the LOD generator 40009.

The RAHT transformer 40008 according to the embodiments performs RAHT coding for predicting attribute information based on the reconstructed geometry information. For example, the RAHT transformer 40008 may predict attribute information of a node at a higher level in the octree based on the attribute information associated with a node at a lower level in the octree.

The LOD generator 40009 according to the embodiments generates a level of detail (LOD) to perform predictive transform coding. The LOD according to the embodiments is a degree of detail of point cloud content. As the LOD value decrease, it indicates that the detail of the point cloud content is degraded. As the LOD value increases, it indicates that the detail of the point cloud content is enhanced. Points may be classified by the LOD.

The lifting transformer 40010 according to the embodiments performs lifting transform coding of transforming the attributes a point cloud based on weights. As described above, lifting transform coding may be optionally applied.

The coefficient quantizer 40011 according to the embodiments quantizes the attribute-coded attributes based on coefficients.

The arithmetic encoder 40012 according to the embodiments encodes the quantized attributes based on arithmetic coding.

Although not shown in the figure, the elements of the point cloud encoder of FIG. 4 may be implemented by hardware including one or more processors or integrated circuits configured to communicate with one or more memories included in the point cloud providing device, software, firmware, or a combination thereof. The one or more processors may perform at least one of the operations and/or functions of the elements of the point cloud encoder of FIG. 4 described above. Additionally, the one or more processors may operate or execute a set of software programs and/or instructions for performing the operations and/or functions of the elements of the point cloud encoder of FIG. 4. The one or more memories according to the embodiments may include a high speed random access memory, or include a non-volatile memory (e.g., one or more magnetic disk storage devices, flash memory devices, or other non-volatile solid-state memory devices).

Figure 5:
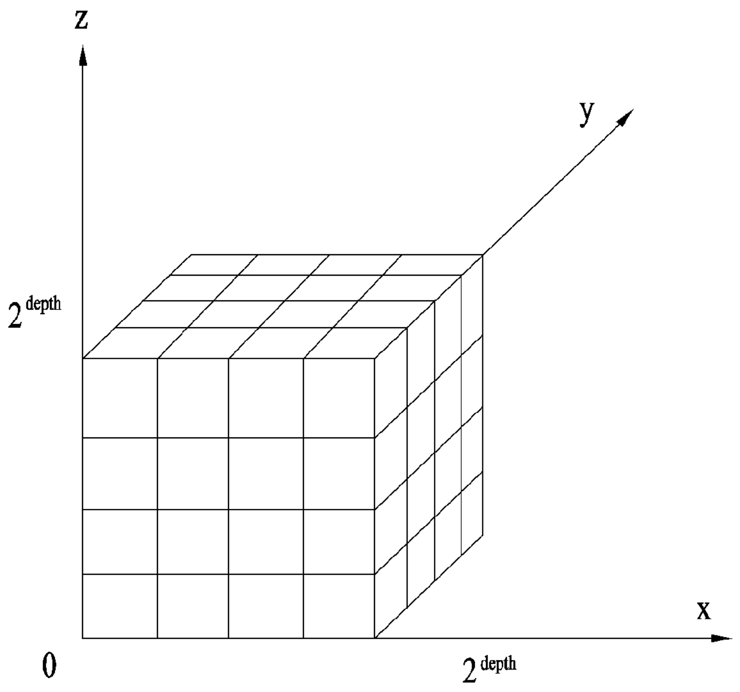
FIG. 5 shows an example of voxels according to embodiments.

FIG. 5 shows an example of voxels according to embodiments.

FIG. 5 shows voxels positioned in a 3D space represented by a coordinate system composed of three axes, which are the X-axis, the Y-axis, and the Z-axis. As described with reference to FIG. 4, the point cloud encoder (e.g., the quantizer 40001) may perform voxelization. Voxel refers to a 3D cubic space generated when a 3D space is divided into units (unit=1.0) based on the axes representing the 3D space (e.g., X-axis, Y-axis, and Z-axis). FIG. 5 shows an example of voxels generated through an octree structure in which a cubical axis-aligned bounding box defined by two poles (0, 0, 0) and ($2^d$, $2^d$, $2^d$) is recursively subdivided. One voxel includes at least one point. The spatial coordinates of a voxel may be estimated from the positional relationship with a voxel group. As described above, a voxel has an attribute (such as color or reflectance) like pixels of a 2D image/video. The details of the voxel are the same as those described with reference to FIG. 4, and therefore a description thereof is omitted.

Figure 6:
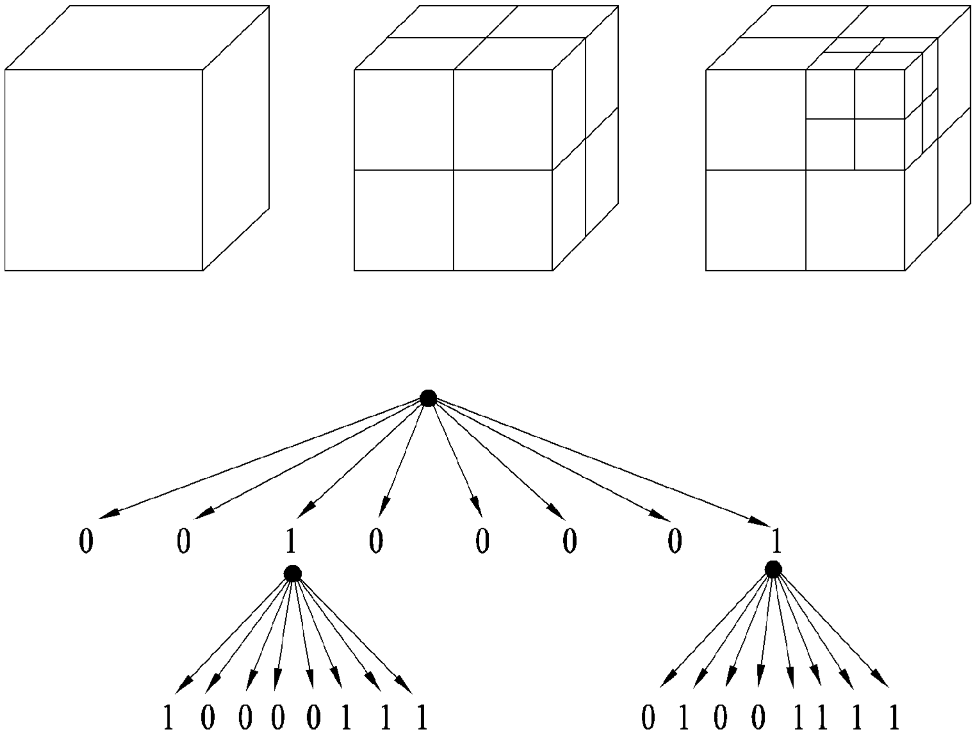
FIG. 6 shows an example of an octree and occupancy code according to embodiments.

FIG. 6 shows an example of an octree and occupancy code according to embodiments.

As described with reference to FIGS. 1 to 4, the point cloud content providing system (point cloud video encoder 10002) or the point cloud encoder (e.g., the octree analyzer 40002) performs octree geometry coding (or octree coding) based on an octree structure to efficiently manage the region and/or position of the voxel.

The upper part of FIG. 6 shows an octree structure. The 3D space of the point cloud content according to the embodiments is represented by axes (e.g., X-axis, Y-axis, and Z-axis) of the coordinate system. The octree structure is created by recursive subdividing of a cubical axis-aligned bounding box defined by two poles (0, 0, 0) and ($2^d$, $2^d$, $2^d$) Here, 2d may be set to a value constituting the smallest bounding box surrounding all points of the point cloud content (or point cloud video). Here, d denotes the depth of the octree. The value of d is determined in the following equation. In the following equation, ($x^{int}_n$, $y^{int}_n$, $z^{int}_n$) denotes the positions (or position values) of quantized points.

$$d = Ceil\left(\mathrm{Log2}\left(\mathrm{Max}\left(x_n^{int}, y_n^{int}, z_n^{int}, n = 1, \ldots, N\right) + 1\right)\right)$$

As shown in the middle of the upper part of FIG. 6, the entire 3D space may be divided into eight spaces according to partition. Each divided space is represented by a cube with six faces. As shown in the upper right of FIG. 6, each of the eight spaces is divided again based on the axes of the coordinate system (e.g., X-axis, Y-axis, and Z-axis). Accordingly, each space is divided into eight smaller spaces. The divided smaller space is also represented by a cube with six faces. This partitioning scheme is applied until the leaf node of the octree becomes a voxel.

The lower part of FIG. 6 shows an octree occupancy code. The occupancy code of the octree is generated to indicate whether each of the eight divided spaces generated by dividing one space contains at least one point. Accordingly, a single occupancy code is represented by eight child nodes. Each child node represents the occupancy of a divided space, and the child node has a value in 1 bit. Accordingly, the occupancy code is represented as an 8-bit code. That is, when at least one point is contained in the space corresponding to a child node, the node is assigned a value of 1. When no point is contained in the space corresponding to the child node (the space is empty), the node is assigned a value of 0. Since the occupancy code shown in FIG. 6 is 00100001, it indicates that the spaces corresponding to the third child node and the eighth child node among the eight child nodes each contain at least one point. As shown in the figure, each of the third child node and the eighth child node has eight child nodes, and the child nodes are represented by an 8-bit occupancy code. The figure shows that the occupancy code of the third child node is 10000111, and the occupancy code of the eighth child node is 01001111. The point cloud encoder (e.g., the arithmetic encoder 40004) according to the embodiments may perform entropy encoding on the occupancy codes. In order to increase the compression efficiency, the point cloud encoder may perform intra/inter-coding on the occupancy codes. The reception device (e.g., the reception device 10004 or the point cloud video decoder 10006) according to the embodiments reconstructs the octree based on the occupancy codes.

The point cloud encoder (e.g., the point cloud encoder of FIG. 4 or the octree analyzer 40002) according to the embodiments may perform voxelization and octree coding to store the positions of points. However, points are not always evenly distributed in the 3D space, and accordingly there may be a specific region in which fewer points are present. Accordingly, it is inefficient to perform voxelization for the entire 3D space. For example, when a specific region contains few points, voxelization does not need to be performed in the specific region.

Accordingly, for the above-described specific region (or a node other than the leaf node of the octree), the point cloud encoder according to the embodiments may skip voxelization and perform direct coding to directly code the positions of points included in the specific region. The coordinates of a direct coding point according to the embodiments are referred to as direct coding mode (DCM). The point cloud encoder according to the embodiments may also perform trisoup geometry encoding, which is to reconstruct the positions of the points in the specific region (or node) based on voxels, based on a surface model. The trisoup geometry encoding is geometry encoding that represents an object as a series of triangular meshes. Accordingly, the point cloud decoder may generate a point cloud from the mesh surface. The direct coding and trisoup geometry encoding according to the embodiments may be selectively performed. In addition, the direct coding and trisoup geometry encoding according to the embodiments may be performed in combination with octree geometry coding (or octree coding).

To perform direct coding, the option to use the direct mode for applying direct coding should be activated. A node to which direct coding is to be applied is not a leaf node, and points less than a threshold should be present within a specific node. In addition, the total number of points to which direct coding is to be applied should not exceed a preset threshold. When the conditions above are satisfied, the point cloud encoder (or the arithmetic encoder 40004) according to the embodiments may perform entropy coding on the positions (or position values) of the points.

The point cloud encoder (e.g., the surface approximation analyzer 40003) according to the embodiments may determine a specific level of the octree (a level less than the depth d of the octree), and the surface model may be used staring with that level to perform trisoup geometry encoding to reconstruct the positions of points in the region of the node based on voxels (Trisoup mode). The point cloud encoder according to the embodiments may specify a level at which trisoup geometry encoding is to be applied. For example, when the specific level is equal to the depth of the octree, the point cloud encoder does not operate in the trisoup mode. In other words, the point cloud encoder according to the embodiments may operate in the trisoup mode only when the specified level is less than the value of depth of the octree. The 3D cube region of the nodes at the specified level according to the embodiments is called a block. One block may include one or more voxels. The block or voxel may correspond to a brick. Geometry is represented as a surface within each block. The surface according to embodiments may intersect with each edge of a block at most once.

One block has 12 edges, and accordingly there are at least 12 intersections in one block. Each intersection is called a vertex (or apex). A vertex present along an edge is detected when there is at least one occupied voxel adjacent to the edge among all blocks sharing the edge. The occupied voxel according to the embodiments refers to a voxel containing a point. The position of the vertex detected along the edge is the average position along the edge of all voxels adjacent to the edge among all blocks sharing the edge.

Once the vertex is detected, the point cloud encoder according to the embodiments may perform entropy encoding on the starting point (x, y, z) of the edge, the direction vector (Δx, Δy, Δz) of the edge, and the vertex position value (relative position value within the edge). When the trisoup geometry encoding is applied, the point cloud encoder according to the embodiments (e.g., the geometry reconstructor 40005) may generate restored geometry (reconstructed geometry) by performing the triangle reconstruction, up-sampling, and voxelization processes.

The vertices positioned at the edge of the block determine a surface that passes through the block. The surface according to the embodiments is a non-planar polygon. In the triangle reconstruction process, a surface represented by a triangle is reconstructed based on the starting point of the edge, the direction vector of the edge, and the position values of the vertices. The triangle reconstruction process is performed by: i) calculating the centroid value of each vertex, ii) subtracting the center value from each vertex value, and iii) estimating the sum of the squares of the values obtained by the subtraction.

$$\begin{bmatrix}\mu_x\\ \mu_y\\ \mu_z\end{bmatrix} = \frac{1}{n}\Sigma_{i=1}^{n}\begin{bmatrix}x_i\\ y_i\\ z_i\end{bmatrix}; \quad \text{i)}$$

$$\begin{bmatrix}\bar{x}_i\\ \bar{y}_i\\ \bar{z}_i\end{bmatrix} = \begin{bmatrix}x_i\\ y_i\\ z_i\end{bmatrix} - \begin{bmatrix}\mu_x\\ \mu_y\\ \mu_z\end{bmatrix}; \quad \text{ii)}$$

$$\begin{bmatrix}\sigma_x^2\\ \sigma_y^2\\ \sigma_z^2\end{bmatrix} = \Sigma_{i=1}^{n}\begin{bmatrix}\bar{x}_i^2\\ \bar{y}_i^2\\ \bar{z}_i^2\end{bmatrix} \quad \text{iii)}$$

The minimum value of the sum is estimated, and the projection process is performed according to the axis with the minimum value. For example, when the element x is the minimum, each vertex is projected on the x-axis with respect to the center of the block, and projected on the (y, z) plane. When the values obtained through projection on the (y, z) plane are (ai, bi), the value of θ is estimated through a tan 2(bi, ai), and the vertices are ordered based on the value of θ. The table below shows a combination of vertices for creating a triangle according to the number of the vertices. The vertices are ordered from 1 to n. The table below shows that for four vertices, two triangles may be constructed according to combinations of vertices. The first triangle may consist of vertices 1, 2, and 3 among the ordered vertices, and the second triangle may consist of vertices 3, 4, and 1 among the ordered vertices.

Triangles formed from vertices ordered 1, . . . , n n triangles
3 (1,2,3)
4 (1,2,3), (3,4,1)
5 (1,2,3), (3,4,5), (5,1,3)
6 (1,2,3), (3,4,5), (5,6,1), (1,3,5)
7 (1,2,3), (3,4,5), (5,6,7), (7,1,3), (3,5,7)
8 (1,2,3), (3,4,5), (5,6,7), (7,8,1), (1,3,5), (5,7,1)
9 (1,2,3), (3,4,5), (5,6,7), (7,8,9), (9,1,3), (3,5,7), (7,9,3)
10 (1,2,3), (3,4,5), (5,6,7), (7,8,9), (9,10,1), (1,3,5), (5,7,9), (9,1,5)
11 (1,2,3), (3,4,5), (5,6,7), (7,8,9), (9,10,11), (11,1,3), (3,5,7), (7,9,11), (11,3,7)
12 (1,2,3), (3,4,5), (5,6,7), (7,8,9), (9,10,11), (11,12,1), (1,3,5), (5,7,9), (9,11,1), (1,5,9)

The upsampling process is performed to add points in the middle along the edge of the triangle and perform voxelization. The added points are generated based on the upsampling factor and the width of the block. The added points are called refined vertices. The point cloud encoder according to the embodiments may voxelize the refined vertices. In addition, the point cloud encoder may perform attribute encoding based on the voxelized positions (or position values).

Figure 7:
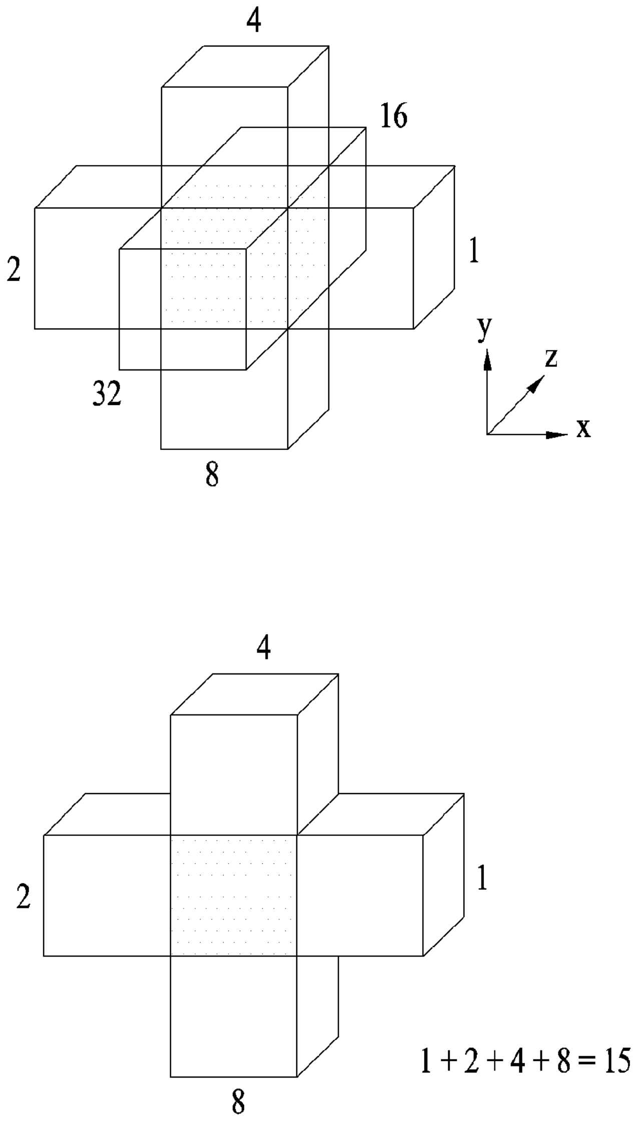
FIG. 7 shows an example of a neighbor node pattern according to embodiments.

FIG. 7 shows an example of a neighbor node pattern according to embodiments.

In order to increase the compression efficiency of the point cloud video, the point cloud encoder according to the embodiments may perform entropy coding based on context adaptive arithmetic coding.

As described with reference to FIGS. 1 to 6, the point cloud content providing system or the point cloud encoder (e.g., the point cloud video encoder 10002, the point cloud encoder or arithmetic encoder 40004 of FIG. 4) may perform entropy coding on the occupancy code immediately. In addition, the point cloud content providing system or the point cloud encoder may perform entropy encoding (intra encoding) based on the occupancy code of the current node and the occupancy of neighboring nodes, or perform entropy encoding (inter encoding) based on the occupancy code of the previous frame. A frame according to embodiments represents a set of point cloud videos generated at the same time. The compression efficiency of intra encoding/inter encoding according to the embodiments may depend on the number of neighboring nodes that are referenced. When the bits increase, the operation becomes complicated, but the encoding may be biased to one side, which may increase the compression efficiency. For example, when a 3-bit context is given, coding needs to be performed using 23=8 methods. The part divided for coding affects the complexity of implementation. Accordingly, it is necessary to meet an appropriate level of compression efficiency and complexity.

FIG. 7 illustrates a process of obtaining an occupancy pattern based on the occupancy of neighbor nodes. The point cloud encoder according to the embodiments determines occupancy of neighbor nodes of each node of the octree and obtains a value of a neighbor pattern. The neighbor node pattern is used to infer the occupancy pattern of the node. The left part of FIG. 7 shows a cube corresponding to a node (a cube positioned in the middle) and six cubes (neighbor nodes) sharing at least one face with the cube. The nodes shown in the figure are nodes of the same depth. The numbers shown in the figure represent weights (1, 2, 4, 8, 16, and 32) associated with the six nodes, respectively. The weights are assigned sequentially according to the positions of neighboring nodes.

The right part of FIG. 7 shows neighbor node pattern values. A neighbor node pattern value is the sum of values multiplied by the weight of an occupied neighbor node (a neighbor node having a point). Accordingly, the neighbor node pattern values are 0 to 63. When the neighbor node pattern value is 0, it indicates that there is no node having a point (no occupied node) among the neighbor nodes of the node. When the neighbor node pattern value is 63, it indicates that all neighbor nodes are occupied nodes. As shown in the figure, since neighbor nodes to which weights 1, 2, 4, and 8 are assigned are occupied nodes, the neighbor node pattern value is 15, the sum of 1, 2, 4, and 8. The point cloud encoder may perform coding according to the neighbor node pattern value (for example, when the neighbor node pattern value is 63, 64 kinds of coding may be performed). According to embodiments, the point cloud encoder may reduce coding complexity by changing a neighbor node pattern value (based on, for example, a table by which 64 is changed to 10 or 6).

Figure 8:
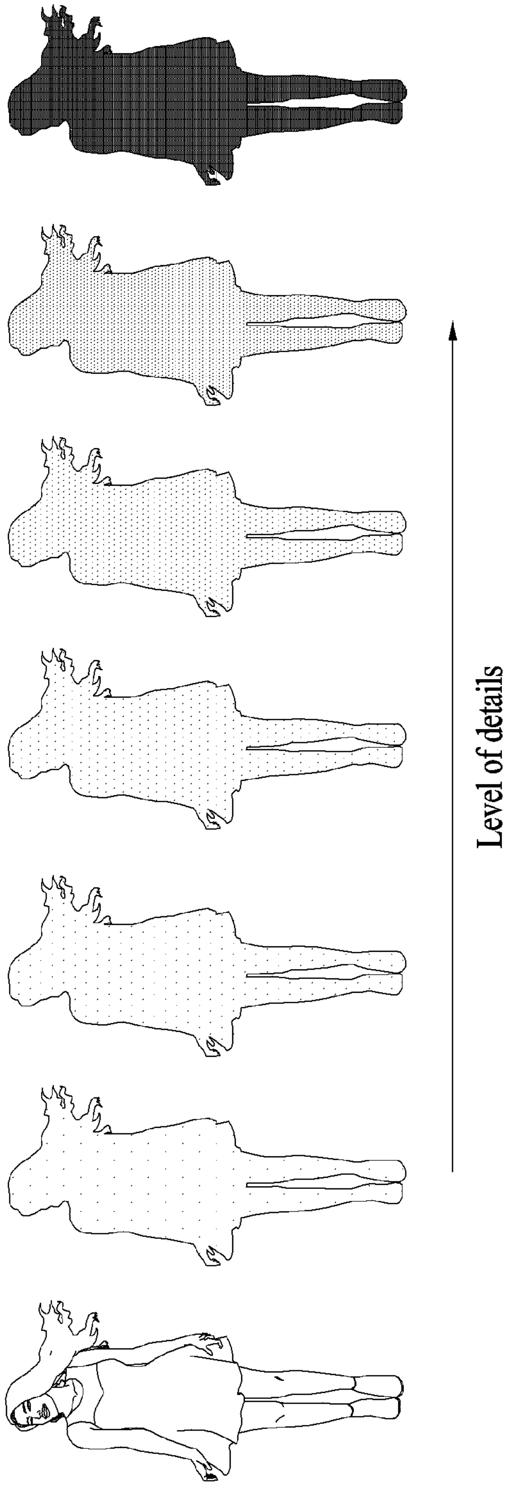
FIG. 8 illustrates an example of point configuration in each level of detail (LOD) according to embodiments.

FIG. 8 illustrates an example of point configuration in each LOD according to embodiments.

As described with reference to FIGS. 1 to 7, encoded geometry is reconstructed (decompressed) before attribute encoding is performed. When direct coding is applied, the geometry reconstruction operation may include changing the placement of direct coded points (e.g., placing the direct coded points in front of the point cloud data). When trisoup geometry encoding is applied, the geometry reconstruction process is performed through triangle reconstruction, up-sampling, and voxelization. Since the attribute depends on the geometry, attribute encoding is performed based on the reconstructed geometry.

The point cloud encoder (e.g., the LOD generator 40009) may classify (reorganize) points by LOD. The figure shows the point cloud content corresponding to LODs. The left-most picture in the figure represents original point cloud content. The second picture from the left of the figure represents distribution of the points in the lowest LOD, and the rightmost picture in the figure represents distribution of the points in the highest LOD. That is, the points in the lowest LOD are sparsely distributed, and the points in the highest LOD are densely distributed. That is, as the LOD rises in the direction pointed by the arrow indicated at the bottom of the figure, the space (or distance) between points is narrowed.

Figure 9:
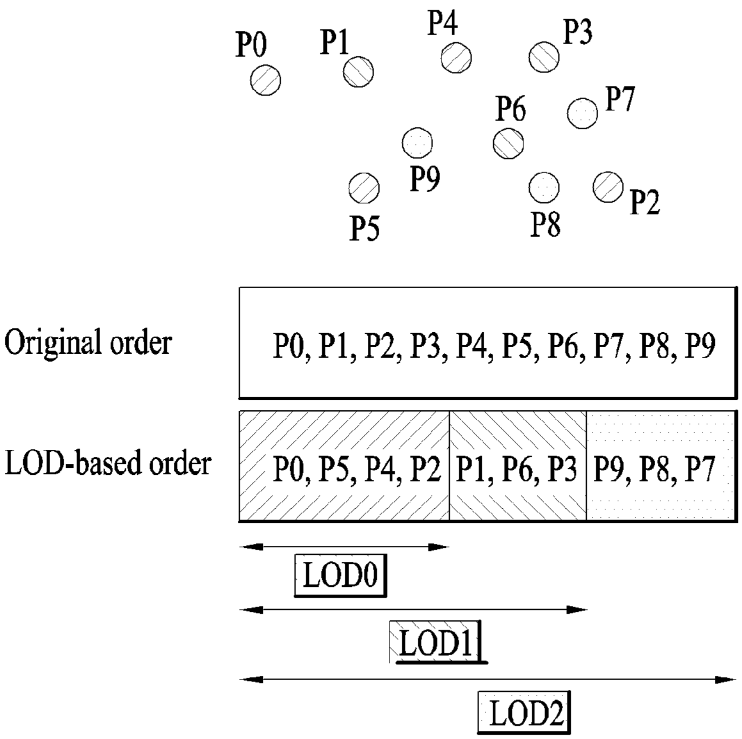
FIG. 9 illustrates an example of point configuration in each LOD according to embodiments.

FIG. 9 illustrates an example of point configuration for each LOD according to embodiments.

As described with reference to FIGS. 1 to 8, the point cloud content providing system, or the point cloud encoder (e.g., the point cloud video encoder 10002, the point cloud encoder of FIG. 4, or the LOD generator 40009) may generates an LOD. The LOD is generated by reorganizing the points into a set of refinement levels according to a set LOD distance value (or a set of Euclidean distances). The LOD generation process is performed not only by the point cloud encoder, but also by the point cloud decoder.

The upper part of FIG. 9 shows examples (P0 to P9) of points of the point cloud content distributed in a 3D space. In FIG. 9, the original order represents the order of points P0 to P9 before LOD generation. In FIG. 9, the LOD based order represents the order of points according to the LOD generation. Points are reorganized by LOD. Also, a high LOD contains the points belonging to lower LODs. As shown in FIG. 9, LOD0 contains P0, P5, P4 and P2. LOD1 contains the points of LOD0, P1, P6 and P3. LOD2 contains the points of LOD0, the points of LOD1, P9, P8 and P7.

As described with reference to FIG. 4, the point cloud encoder according to the embodiments may perform predictive transform coding, lifting transform coding, and RAHT transform coding selectively or in combination.

The point cloud encoder according to the embodiments may generate a predictor for points to perform predictive transform coding for setting a predicted attribute (or predicted attribute value) of each point. That is, N predictors may be generated for N points. The predictor according to the embodiments may calculate a weight (=1/distance) based on the LOD value of each point, indexing information about neighboring points present within a set distance for each LOD, and a distance to the neighboring points.

The predicted attribute (or attribute value) according to the embodiments is set to the average of values obtained by multiplying the attributes (or attribute values) (e.g., color, reflectance, etc.) of neighbor points set in the predictor of each point by a weight (or weight value) calculated based on the distance to each neighbor point. The point cloud encoder according to the embodiments (e.g., the coefficient quantizer 40011) may quantize and inversely quantize the residuals (which may be called residual attributes, residual attribute values, or attribute prediction residuals) obtained by subtracting a predicted attribute (attribute value) from the attribute (attribute value) of each point. The quantization process is configured as shown in the following table.

TABLE 1

Attribute prediction residuals quantization pseudo code

```
int PCCQuantization(int value, int quantStep) {
if( value >=0) {
return floor(value / quantStep + 1.0 / 3.0);
} else {
return -floor(-value / quantStep + 1.0 / 3.0);
}
}
```

TABLE 2

Attribute prediction residuals inverse quantization pseudo code

```
int PCCInverseQuantization(int value, int quantStep) {
if( quantStep == 0) {
return value;
} else {
return value * quantStep;
}
}
```

When the predictor of each point has neighbor points, the point cloud encoder (e.g., the arithmetic encoder 40012) according to the embodiments may perform entropy coding on the quantized and inversely quantized residual values as described above. When the predictor of each point has no neighbor point, the point cloud encoder according to the embodiments (e.g., the arithmetic encoder 40012) may perform entropy coding on the attributes of the corresponding point without performing the above-described operation.

The point cloud encoder according to the embodiments (e.g., the lifting transformer 40010) may generate a predictor of each point, set the calculated LOD and register neighbor points in the predictor, and set weights according to the distances to neighbor points to perform lifting transform coding. The lifting transform coding according to the embodiments is similar to the above-described predictive transform coding, but differs therefrom in that weights are cumulatively applied to attribute values. The process of cumulatively applying weights to the attribute values according to embodiments is configured as follows.

1) Create an array Quantization Weight (QW) for storing the weight value of each point. The initial value of all elements of QW is 1.0. Multiply the QW values of the predictor indexes of the neighbor nodes registered in the predictor by the weight of the predictor of the current point, and add the values obtained by the multiplication.

2) Lift prediction process: Subtract the value obtained by multiplying the attribute value of the point by the weight from the existing attribute value to calculate a predicted attribute value.

3) Create temporary arrays called updateweight and update and initialize the temporary arrays to zero.

4) Cumulatively add the weights calculated by multiplying the weights calculated for all predictors by a weight stored in the QW corresponding to a predictor index to the updateweight array as indexes of neighbor nodes. Cumulatively add, to the update array, a value obtained by multiplying the attribute value of the index of a neighbor node by the calculated weight.

5) Lift update process: Divide the attribute values of the update array for all predictors by the weight value of the updateweight array of the predictor index, and add the existing attribute value to the values obtained by the division.

6) Calculate predicted attributes by multiplying the attribute values updated through the lift update process by the weight updated through the lift prediction process (stored in the QW) for all predictors. The point cloud encoder (e.g., coefficient quantizer 40011) according to the embodiments quantizes the predicted attribute values. In addition, the point cloud encoder (e.g., the arithmetic encoder 40012) performs entropy coding on the quantized attribute values.

The point cloud encoder (e.g., the RAHT transformer 40008) according to the embodiments may perform RAHT transform coding in which attributes of nodes of a higher level are predicted using the attributes associated with nodes of a lower level in the octree. RAHT transform coding is an example of attribute intra coding through an octree backward scan. The point cloud encoder according to the embodiments scans the entire region from the voxel and repeats the merging process of merging the voxels into a larger block at each step until the root node is reached. The merging process according to the embodiments is performed only on the occupied nodes. The merging process is not performed on the empty node. The merging process is performed on an upper node immediately above the empty node.

The equation below represents a RAHT transformation matrix. In the equation, $g_{l_{x,y,z}}$ denotes the average attribute value of voxels at level l. $g_{l_{x,y,z}}$ may be calculated based on $g_{l+1_{2x,y,z}}$ and $g_{l+1_{2x+1,y,z}}$. The weights for $g_{l_{2x,y,z}}$ and $g_{l_{2x+1,y,z}}$ are $w1=w_{l_{2x,y,z}}$ and $w2=w_{l_{2x+1,y,z}}$.

$$\begin{bmatrix} g_{l-1_{x,y,z}} \\ h_{l-1_{x,y,z}} \end{bmatrix} = T_{w1w2}\begin{bmatrix} g_{l_{2x,y,z}} \\ g_{l_{2x+1,y,z}} \end{bmatrix},$$

$$T_{w1w2} = \frac{1}{\sqrt{w1+w2}}\begin{bmatrix} \sqrt{w1} & \sqrt{w2} \\ -\sqrt{w2} & \sqrt{w1} \end{bmatrix}$$

Here, $g_{l-1_{x,y,z}}$ is a low-pass value and is used in the merging process at the next higher level. $h_{l-1_{x,y,z}}$ denotes high-pass coefficients. The high-pass coefficients at each step are quantized and subjected to entropy coding (e.g., encoding by the arithmetic encoder 400012). The weights are calculated as $w_{l-1_{x,y,z}}=w_{l_{2x,y,z}}+w_{l_{2x+1,y,z}}$. The root node is created through the $g_{1_{0,0,0}}$ and $g_{1_{0,0,1}}$ as follows.

$$\begin{bmatrix} gDC \\ h_{0_{0,0,0}} \end{bmatrix} = T_{w1000\,w1001}\begin{bmatrix} g_{1_{0,0,0z}} \\ g_{1_{0,0,1}} \end{bmatrix}$$

The value of gDC is also quantized and subjected to entropy coding like the high-pass coefficients.

Figure 10:
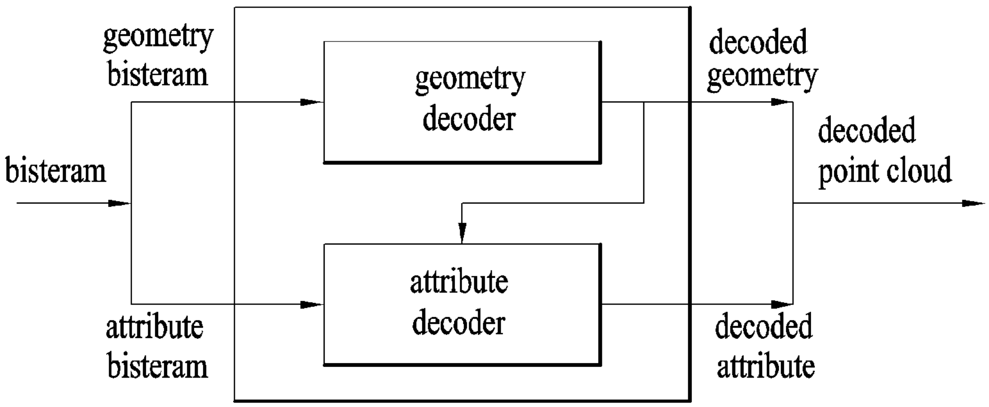
FIG. 10 illustrates a point cloud decoder according to embodiments.

FIG. 10 illustrates a point cloud decoder according to embodiments.

The point cloud decoder illustrated in FIG. 10 is an example of the point cloud video decoder 10006 described in FIG. 1, and may perform the same or similar operations as the operations of the point cloud video decoder 10006 illustrated in FIG. 1. As shown in the figure, the point cloud decoder may receive a geometry bitstream and an attribute bitstream contained in one or more bitstreams. The point cloud decoder includes a geometry decoder and an attribute decoder. The geometry decoder performs geometry decoding on the geometry bitstream and outputs decoded geometry. The attribute decoder performs attribute decoding based on the decoded geometry and the attribute bitstream, and outputs decoded attributes. The decoded geometry and decoded attributes are used to reconstruct point cloud content (a decoded point cloud).

Figure 11:
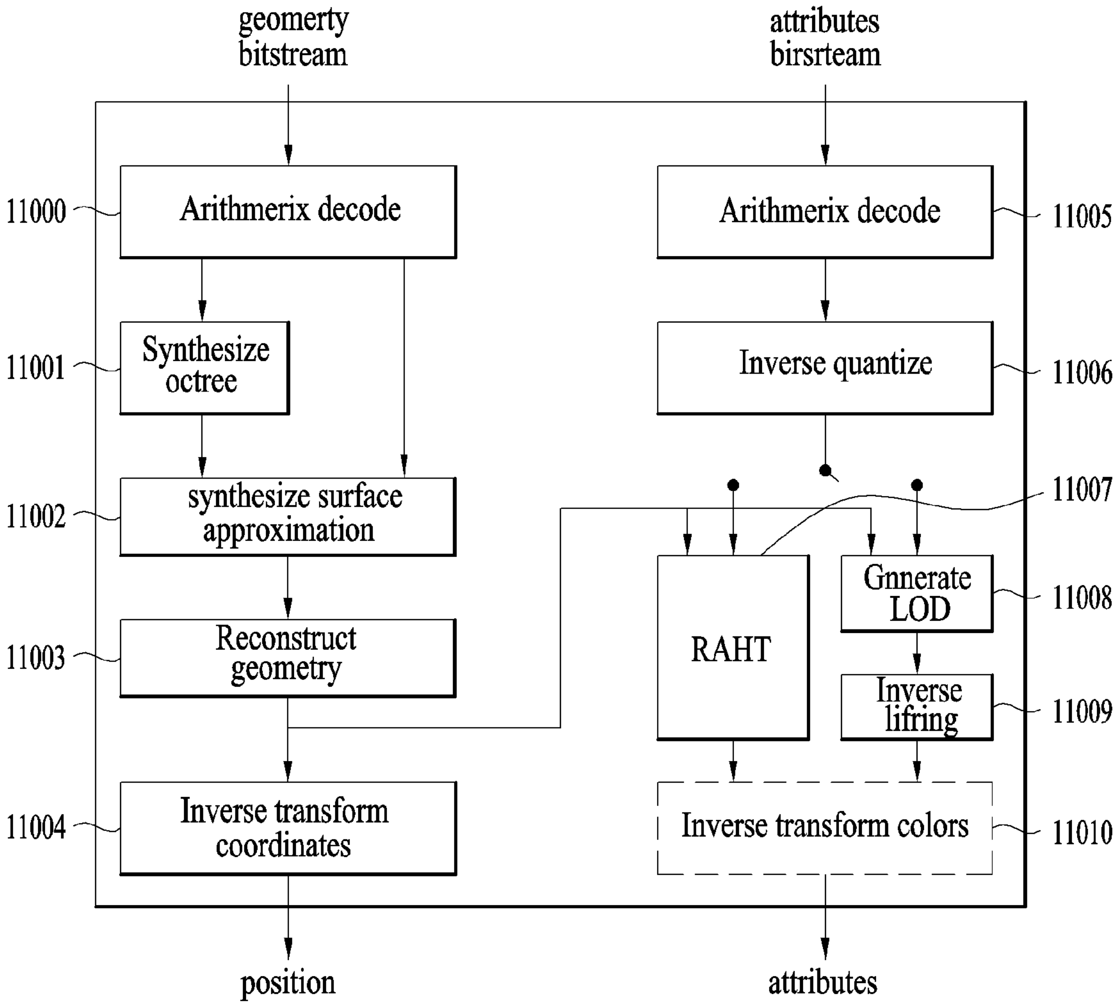
FIG. 11 illustrates a point cloud decoder according to embodiments.

FIG. 11 illustrates a point cloud decoder according to embodiments.

The point cloud decoder illustrated in FIG. 11 is an example of the point cloud decoder illustrated in FIG. 10, and may perform a decoding operation, which is an inverse process of the encoding operation of the point cloud encoder illustrated in FIGS. 1 to 9.

As described with reference to FIGS. 1 and 10, the point cloud decoder may perform geometry decoding and attribute decoding. The geometry decoding is performed before the attribute decoding.

The point cloud decoder according to the embodiments includes an arithmetic decoder (Arithmetic decode) 11000, an octree synthesizer (Synthesize octree) 11001, a surface approximation synthesizer (Synthesize surface approximation) 11002, and a geometry reconstructor (Reconstruct geometry) 11003, a coordinate inverse transformer (Inverse transform coordinates) 11004, an arithmetic decoder (Arithmetic decode) 11005, an inverse quantizer (Inverse quantize) 11006, a RAHT transformer 11007, an LOD generator (Generate LOD) 11008, an inverse lifter (inverse lifting) 11009, and/or a color inverse transformer (Inverse transform colors) 11010.

The arithmetic decoder 11000, the octree synthesizer 11001, the surface approximation synthesizer 11002, and the geometry reconstructor 11003, and the coordinate inverse transformer 11004 may perform geometry decoding. The geometry decoding according to the embodiments may include direct decoding and trisoup geometry decoding. The direct decoding and trisoup geometry decoding are selectively applied. The geometry decoding is not limited to the above-described example, and is performed as an inverse process of the geometry encoding described with reference to FIGS. 1 to 9.

The arithmetic decoder 11000 according to the embodiments decodes the received geometry bitstream based on the arithmetic coding. The operation of the arithmetic decoder 11000 corresponds to the inverse process of the arithmetic encoder 40004.

The octree synthesizer 11001 according to the embodiments may generate an octree by acquiring an occupancy code from the decoded geometry bitstream (or information on the geometry secured as a result of decoding). The occupancy code is configured as described in detail with reference to FIGS. 1 to 9.

When the trisoup geometry encoding is applied, the surface approximation synthesizer 11002 according to the embodiments may synthesize a surface based on the decoded geometry and/or the generated octree.

The geometry reconstructor 11003 according to the embodiments may regenerate geometry based on the surface and/or the decoded geometry. As described with reference to FIGS. 1 to 9, direct coding and trisoup geometry encoding are selectively applied. Accordingly, the geometry reconstructor 11003 directly imports and adds position information about the points to which direct coding is applied. When the trisoup geometry encoding is applied, the geometry reconstructor 11003 may reconstruct the geometry by performing the reconstruction operations of the geometry reconstructor 40005, for example, triangle reconstruction, up-sampling, and voxelization. Details are the same as those described with reference to FIG. 6, and thus description thereof is omitted. The reconstructed geometry may include a point cloud picture or frame that does not contain attributes.

The coordinate inverse transformer 11004 according to the embodiments may acquire positions of the points by transforming the coordinates based on the reconstructed geometry.

The arithmetic decoder 11005, the inverse quantizer 11006, the RAHT transformer 11007, the LOD generator 11008, the inverse lifter 11009, and/or the color inverse transformer 11010 may perform the attribute decoding described with reference to FIG. 10. The attribute decoding according to the embodiments includes region adaptive hierarchical transform (RAHT) decoding, interpolation-based hierarchical nearest-neighbor prediction (predictive transform) decoding, and interpolation-based hierarchical nearest-neighbor prediction with an update/lifting step (lifting transform) decoding. The three decoding schemes described above may be used selectively, or a combination of one or more decoding schemes may be used. The attribute decoding according to the embodiments is not limited to the above-described example.

The arithmetic decoder 11005 according to the embodiments decodes the attribute bitstream by arithmetic coding.

The inverse quantizer 11006 according to the embodiments inversely quantizes the information about the decoded attribute bitstream or attributes secured as a result of the decoding, and outputs the inversely quantized attributes (or attribute values). The inverse quantization may be selectively applied based on the attribute encoding of the point cloud encoder.

According to embodiments, the RAHT transformer 11007, the LOD generator 11008, and/or the inverse lifter 11009 may process the reconstructed geometry and the inversely quantized attributes. As described above, the RAHT transformer 11007, the LOD generator 11008, and/or the inverse lifter 11009 may selectively perform a decoding operation corresponding to the encoding of the point cloud encoder.

The color inverse transformer 11010 according to the embodiments performs inverse transform coding to inversely transform a color value (or texture) included in the decoded attributes. The operation of the color inverse transformer 11010 may be selectively performed based on the operation of the color transformer 40006 of the point cloud encoder.

Although not shown in the figure, the elements of the point cloud decoder of FIG. 11 may be implemented by hardware including one or more processors or integrated circuits configured to communicate with one or more memories included in the point cloud providing device, software, firmware, or a combination thereof. The one or more processors may perform at least one or more of the operations and/or functions of the elements of the point cloud decoder of FIG. 11 described above. Additionally, the one or more processors may operate or execute a set of software programs and/or instructions for performing the operations and/or functions of the elements of the point cloud decoder of FIG. 11.

Figure 12:
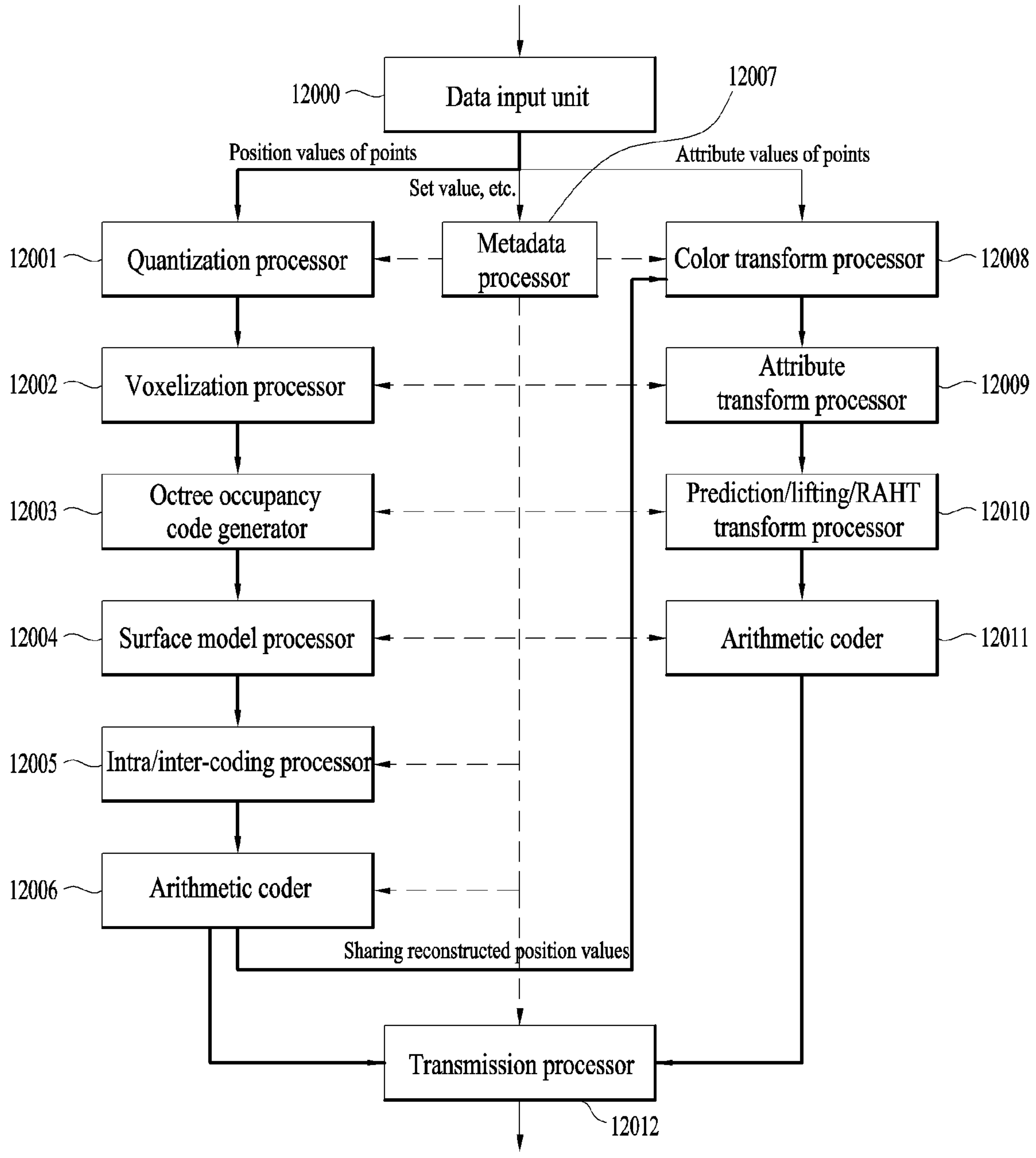
FIG. 12 illustrates a point cloud data transmission device according to embodiments.

FIG. 12 illustrates a transmission device according to embodiments.

The transmission device shown in FIG. 12 is an example of the transmission device 10000 of FIG. 1 (or the point cloud encoder of FIG. 4). The transmission device illustrated in FIG. 12 may perform one or more of the operations and methods the same as or similar to those of the point cloud encoder described with reference to FIGS. 1 to 9. The transmission device according to the embodiments may include a data input unit 12000, a quantization processor 12001, a voxelization processor 12002, an octree occupancy code generator 12003, a surface model processor 12004, an intra/inter-coding processor 12005, an arithmetic coder 12006, a metadata processor 12007, a color transform processor 12008, an attribute transform processor 12009, a prediction/lifting/RAHT transform processor 12010, an arithmetic coder 12011 and/or a transmission processor 12012.

The data input unit 12000 according to the embodiments receives or acquires point cloud data. The data input unit 12000 may perform an operation and/or acquisition method the same as or similar to the operation and/or acquisition method of the point cloud video acquirer 10001 (or the acquisition process 20000 described with reference to FIG. 2).

The data input unit 12000, the quantization processor 12001, the voxelization processor 12002, the octree occupancy code generator 12003, the surface model processor 12004, the intra/inter-coding processor 12005, and the arithmetic coder 12006 perform geometry encoding. The geometry encoding according to the embodiments is the same as or similar to the geometry encoding described with reference to FIGS. 1 to 9, and thus a detailed description thereof is omitted.

The quantization processor 12001 according to the embodiments quantizes geometry (e.g., position values of points). The operation and/or quantization of the quantization processor 12001 is the same as or similar to the operation and/or quantization of the quantizer 40001 described with reference to FIG. 4. Details are the same as those described with reference to FIGS. 1 to 9.

The voxelization processor 12002 according to the embodiments voxelizes the quantized position values of the points. The voxelization processor 12002 may perform an operation and/or process the same or similar to the operation and/or the voxelization process of the quantizer 40001 described with reference to FIG. 4. Details are the same as those described with reference to FIGS. 1 to 9.

The octree occupancy code generator 12003 according to the embodiments performs octree coding on the voxelized positions of the points based on an octree structure. The octree occupancy code generator 12003 may generate an occupancy code. The octree occupancy code generator 12003 may perform an operation and/or method the same as or similar to the operation and/or method of the point cloud encoder (or the octree analyzer 40002) described with reference to FIGS. 4 and 6. Details are the same as those described with reference to FIGS. 1 to 9.

The surface model processor 12004 according to the embodiments may perform trigsoup geometry encoding based on a surface model to reconstruct the positions of points in a specific region (or node) on a voxel basis. The surface model processor 12004 may perform an operation and/or method the same as or similar to the operation and/or method of the point cloud encoder (e.g., the surface approximation analyzer 40003) described with reference to FIG. 4. Details are the same as those described with reference to FIGS. 1 to 9.

The intra/inter-coding processor 12005 according to the embodiments may perform intra/inter-coding on point cloud data. The intra/inter-coding processor 12005 may perform coding the same as or similar to the intra/inter-coding described with reference to FIG. 7. Details are the same as those described with reference to FIG. 7. According to embodiments, the intra/inter-coding processor 12005 may be included in the arithmetic coder 12006.

The arithmetic coder 12006 according to the embodiments performs entropy encoding on an octree of the point cloud data and/or an approximated octree. For example, the encoding scheme includes arithmetic encoding. The arithmetic coder 12006 performs an operation and/or method the same as or similar to the operation and/or method of the arithmetic encoder 40004.

The metadata processor 12007 according to the embodiments processes metadata about the point cloud data, for example, a set value, and provides the same to a necessary processing process such as geometry encoding and/or attribute encoding. Also, the metadata processor 12007 according to the embodiments may generate and/or process signaling information related to the geometry encoding and/or the attribute encoding. The signaling information according to the embodiments may be encoded separately from the geometry encoding and/or the attribute encoding. The signaling information according to the embodiments may be interleaved.

The color transform processor 12008, the attribute transform processor 12009, the prediction/lifting/RAHT transform processor 12010, and the arithmetic coder 12011 perform the attribute encoding. The attribute encoding according to the embodiments is the same as or similar to the attribute encoding described with reference to FIGS. 1 to 9, and thus a detailed description thereof is omitted.

The color transform processor 12008 according to the embodiments performs color transform coding to transform color values included in attributes. The color transform processor 12008 may perform color transform coding based on the reconstructed geometry. The reconstructed geometry is the same as described with reference to FIGS. 1 to 9. Also, it performs an operation and/or method the same as or similar to the operation and/or method of the color transformer 40006 described with reference to FIG. 4 is performed. The detailed description thereof is omitted.

The attribute transform processor 12009 according to the embodiments performs attribute transformation to transform the attributes based on the reconstructed geometry and/or the positions on which geometry encoding is not performed. The attribute transform processor 12009 performs an operation and/or method the same as or similar to the operation and/or method of the attribute transformer 40007 described with reference to FIG. 4. The detailed description thereof is omitted. The prediction/lifting/RAHT transform processor 12010 according to the embodiments may code the transformed attributes by any one or a combination of RAHT coding, predictive transform coding, and lifting transform coding. The prediction/lifting/RAHT transform processor 12010 performs at least one of the operations the same as or similar to the operations of the RAHT transformer 40008, the LOD generator 40009, and the lifting transformer 40010 described with reference to FIG. 4. In addition, the predictive transform coding, the lifting transform coding, and the RAHT transform coding are the same as those described with reference to FIGS. 1 to 9, and thus a detailed description thereof is omitted.

The arithmetic coder 12011 according to the embodiments may encode the coded attributes based on the arithmetic coding. The arithmetic coder 12011 performs an operation and/or method the same as or similar to the operation and/or method of the arithmetic encoder 400012.

The transmission processor 12012 according to the embodiments may transmit each bitstream containing encoded geometry and/or encoded attributes and metadata information, or transmit one bitstream configured with the encoded geometry and/or the encoded attributes and the metadata information. When the encoded geometry and/or the encoded attributes and the metadata information according to the embodiments are configured into one bitstream, the bitstream may include one or more sub-bitstreams. The bitstream according to the embodiments may contain signaling information including a sequence parameter set (SPS) for signaling of a sequence level, a geometry parameter set (GPS) for signaling of geometry information coding, an attribute parameter set (APS) for signaling of attribute information coding, and a tile parameter set (TPS) for signaling of a tile level, and slice data. The slice data may include information about one or more slices. One slice according to embodiments may include one geometry bitstream Geom00 and one or more attribute bitstreams Attr00 and Attr10.

A slice refers to a series of syntax elements representing the entirety or part of a coded point cloud frame.

The TPS according to the embodiments may include information about each tile (e.g., coordinate information and height/size information about a bounding box) for one or more tiles. The geometry bitstream may contain a header and a payload. The header of the geometry bitstream according to the embodiments may contain a parameter set identifier (geom_parameter_set_id), a tile identifier (geom_tile_id) and a slice identifier (geom_slice_id) included in the GPS, and information about the data contained in the payload. As described above, the metadata processor 12007 according to the embodiments may generate and/or process the signaling information and transmit the same to the transmission processor 12012. According to embodiments, the elements to perform geometry encoding and the elements to perform attribute encoding may share data/information with each other as indicated by dotted lines. The transmission processor 12012 according to the embodiments may perform an operation and/or transmission method the same as or similar to the operation and/or transmission method of the transmitter 10003. Details are the same as those described with reference to FIGS. 1 and 2, and thus a description thereof is omitted.

Figure 13:
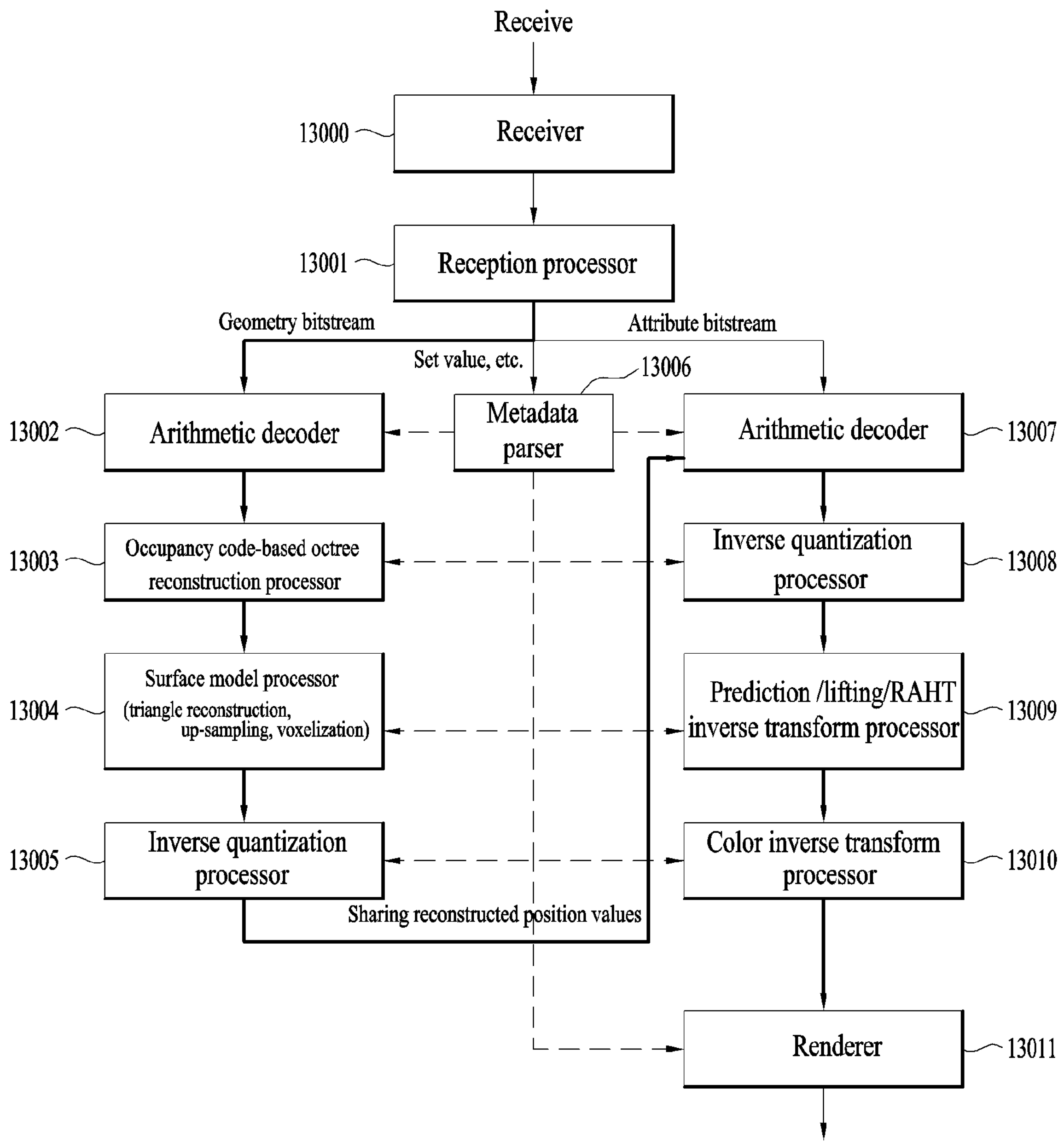
FIG. 13 illustrates a point cloud data reception device according to embodiments.

FIG. 13 illustrates a reception device according to embodiments.

The reception device illustrated in FIG. 13 is an example of the reception device 10004 of FIG. 1 (or the point cloud decoder of FIGS. 10 and 11). The reception device illustrated in FIG. 13 may perform one or more of the operations and methods the same as or similar to those of the point cloud decoder described with reference to FIGS. 1 to 11.

The reception device according to the embodiment includes a receiver 13000, a reception processor 13001, an arithmetic decoder 13002, an occupancy code-based octree reconstruction processor 13003, a surface model processor (triangle reconstruction, up-sampling, voxelization) 13004, an inverse quantization processor 13005, a metadata parser 13006, an arithmetic decoder 13007, an inverse quantization processor 13008, a prediction/lifting/RAHT inverse transform processor 13009, a color inverse transform processor 13010, and/or a renderer 13011. Each element for decoding according to the embodiments may perform a reverse process of the operation of a corresponding element for encoding according to the embodiments.

The receiver 13000 according to the embodiments receives point cloud data. The receiver 13000 may perform an operation and/or reception method the same as or similar to the operation and/or reception method of the receiver 10005 of FIG. 1. The detailed description thereof is omitted.

The reception processor 13001 according to the embodiments may acquire a geometry bitstream and/or an attribute bitstream from the received data. The reception processor 13001 may be included in the receiver 13000.

The arithmetic decoder 13002, the occupancy code-based octree reconstruction processor 13003, the surface model processor 13004, and the inverse quantization processor 13005 may perform geometry decoding. The geometry decoding according to embodiments is the same as or similar to the geometry decoding described with reference to FIGS. 1 to 10, and thus a detailed description thereof is omitted.

The arithmetic decoder 13002 according to the embodiments may decode the geometry bitstream based on arithmetic coding. The arithmetic decoder 13002 performs an operation and/or coding the same as or similar to the operation and/or coding of the arithmetic decoder 11000.

The occupancy code-based octree reconstruction processor 13003 according to the embodiments may reconstruct an octree by acquiring an occupancy code from the decoded geometry bitstream (or information about the geometry secured as a result of decoding). The occupancy code-based octree reconstruction processor 13003 performs an operation and/or method the same as or similar to the operation and/or octree generation method of the octree synthesizer 11001. When the trisoup geometry encoding is applied, the surface model processor 13004 according to the embodiments may perform trisoup geometry decoding and related geometry reconstruction (e.g., triangle reconstruction, up-sampling, voxelization) based on the surface model method. The surface model processor 13004 performs an operation the same as or similar to that of the surface approximation synthesizer 11002 and/or the geometry reconstructor 11003.

The inverse quantization processor 13005 according to the embodiments may inversely quantize the decoded geometry.

The metadata parser 13006 according to the embodiments may parse metadata contained in the received point cloud data, for example, a set value. The metadata parser 13006 may pass the metadata to geometry decoding and/or attribute decoding. The metadata is the same as that described with reference to FIG. 12, and thus a detailed description thereof is omitted.

The arithmetic decoder 13007, the inverse quantization processor 13008, the prediction/lifting/RAHT inverse transform processor 13009 and the color inverse transform processor 13010 perform attribute decoding. The attribute decoding is the same as or similar to the attribute decoding described with reference to FIGS. 1 to 10, and thus a detailed description thereof is omitted.

The arithmetic decoder 13007 according to the embodiments may decode the attribute bitstream by arithmetic coding. The arithmetic decoder 13007 may decode the attribute bitstream based on the reconstructed geometry. The arithmetic decoder 13007 performs an operation and/or coding the same as or similar to the operation and/or coding of the arithmetic decoder 11005.

The inverse quantization processor 13008 according to the embodiments may inversely quantize the decoded attribute bitstream. The inverse quantization processor 13008 performs an operation and/or method the same as or similar to the operation and/or inverse quantization method of the inverse quantizer 11006.

The prediction/lifting/RAHT inverse transformer 13009 according to the embodiments may process the reconstructed geometry and the inversely quantized attributes. The prediction/lifting/RAHT inverse transform processor 13009 performs one or more of operations and/or decoding the same as or similar to the operations and/or decoding of the RAHT transformer 11007, the LOD generator 11008, and/or the inverse lifter 11009. The color inverse transform processor 13010 according to the embodiments performs inverse transform coding to inversely transform color values (or textures) included in the decoded attributes. The color inverse transform processor 13010 performs an operation and/or inverse transform coding the same as or similar to the operation and/or inverse transform coding of the color inverse transformer 11010. The renderer 13011 according to the embodiments may render the point cloud data.

Figure 14:
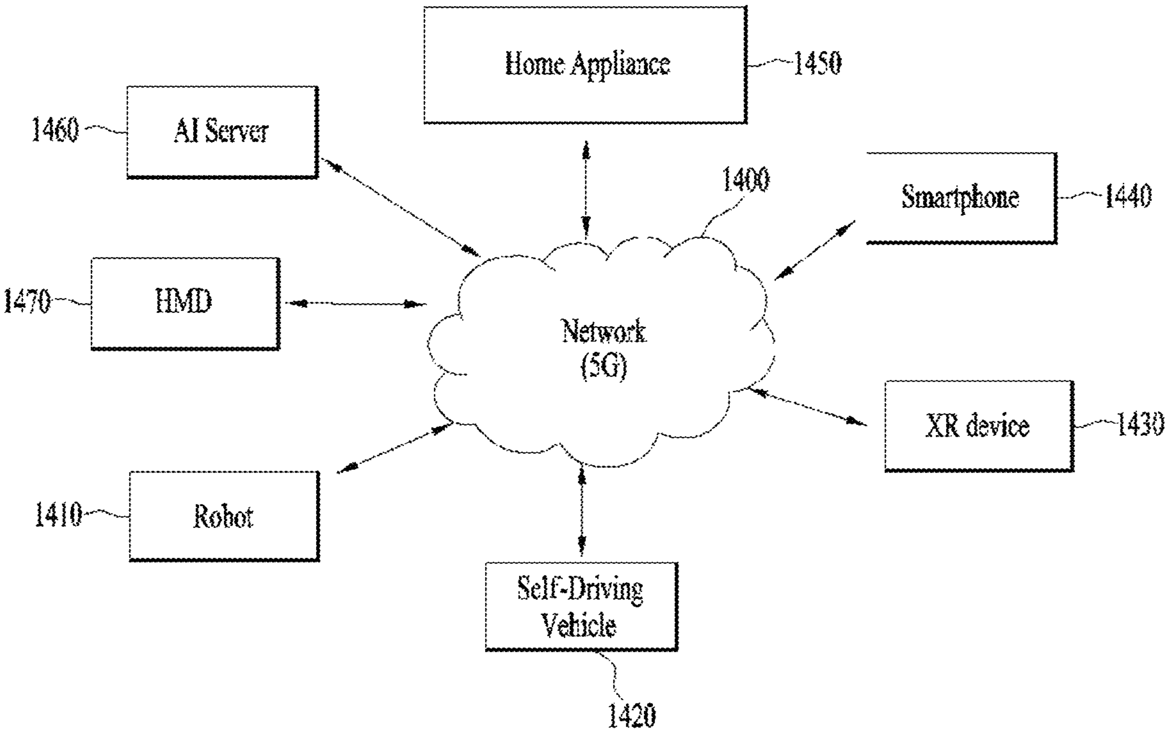
FIG. 14 illustrates an exemplary structure operable in connection with point cloud data transmission/reception methods/devices according to embodiments.

FIG. 14 illustrates an exemplary structure operable in connection with point cloud data transmission/reception methods/devices according to embodiments.

The structure of FIG. 14 represents a configuration in which at least one of a server 1460, a robot 1410, a self-driving vehicle 1420, an XR device 1430, a smartphone 1440, a home appliance 1450, and/or a head-mount display (HMD) 1470 is connected to the cloud network 1400. The robot 1410, the self-driving vehicle 1420, the XR device 1430, the smartphone 1440, or the home appliance 1450 is called a device. Further, the XR device 1430 may correspond to a point cloud data (PCC) device according to embodiments or may be operatively connected to the PCC device.

The cloud network 1400 may represent a network that constitutes part of the cloud computing infrastructure or is present in the cloud computing infrastructure. Here, the cloud network 1400 may be configured using a 3G network, 4G or Long Term Evolution (LTE) network, or a 5G network.

The server 1460 may be connected to at least one of the robot 1410, the self-driving vehicle 1420, the XR device 1430, the smartphone 1440, the home appliance 1450, and/or the HMD 1470 over the cloud network 1400 and may assist in at least a part of the processing of the connected devices 1410 to 1470.

The HMD 1470 represents one of the implementation types of the XR device and/or the PCC device according to the embodiments. The HMD type device according to the embodiments includes a communication unit, a control unit, a memory, an I/O unit, a sensor unit, and a power supply unit.

Hereinafter, various embodiments of the devices 1410 to 1450 to which the above-described technology is applied will be described. The devices 1410 to 1450 illustrated in FIG. 14 may be operatively connected/coupled to a point cloud data transmission device and reception according to the above-described embodiments.

<PCC+XR>

The XR/PCC device 1430 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 1430 may analyze 3D point cloud data or image data acquired through various sensors or from an external device and generate position data and attribute data about 3D points. Thereby, the XR/PCC device 1430 may acquire information about the surrounding space or a real object, and render and output an XR object. For example, the XR/PCC device 1430 may match an XR object including auxiliary information about a recognized object with the recognized object and output the matched XR object.

<PCC+XR+Mobile Phone>

The XR/PCC device 1430 may be implemented as a mobile phone 1440 by applying PCC technology.

The mobile phone 1440 may decode and display point cloud content based on the PCC technology.

<PCC+Self-Driving+XR>

The self-driving vehicle 1420 may be implemented as a mobile robot, a vehicle, an unmanned aerial vehicle, or the like by applying the PCC technology and the XR technology.

The self-driving vehicle 1420 to which the XR/PCC technology is applied may represent a self-driving vehicle provided with means for providing an XR image, or a self-driving vehicle that is a target of control/interaction in the XR image. In particular, the self-driving vehicle 1420 which is a target of control/interaction in the XR image may be distinguished from the XR device 1430 and may be operatively connected thereto.

The self-driving vehicle 1420 having means for providing an XR/PCC image may acquire sensor information from sensors including a camera, and output the generated XR/PCC image based on the acquired sensor information. For example, the self-driving vehicle 1420 may have an HUD and output an XR/PCC image thereto, thereby providing an occupant with an XR/PCC object corresponding to a real object or an object present on the screen.

When the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap an object on the screen. For example, the self-driving vehicle 1220 may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only CG images of real-world objects, backgrounds, and the like. On the other hand, the AR technology refers to a technology that shows a virtually created CG image on the image of a real object. The MR technology is similar to the AR technology described above in that virtual objects to be shown are mixed and combined with the real world. However, the MR technology differs from the AR technology in that the AR technology makes a clear distinction between a real object and a virtual object created as a CG image and uses virtual objects as complementary objects for real objects, whereas the MR technology treats virtual objects as objects having equivalent characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to any of the VR, AR, MR, and XR technologies. The encoding/decoding based on PCC, V-PCC, and G-PCC techniques is applicable to such technologies.

The PCC method/device according to the embodiments may be applied to a vehicle that provides a self-driving service.

A vehicle that provides the self-driving service is connected to a PCC device for wired/wireless communication.

When the point cloud data (PCC) transmission/reception device according to the embodiments is connected to a vehicle for wired/wireless communication, the device may receive/process content data related to an AR/VR/PCC service, which may be provided together with the self-driving service, and transmit the same to the vehicle. In the case where the PCC transmission/reception device is mounted on a vehicle, the PCC transmission/reception device may receive/process content data related to the AR/VR/PCC service according to a user input signal input through a user interface device and provide the same to the user. The vehicle or the user interface device according to the embodiments may receive a user input signal. The user input signal according to the embodiments may include a signal indicating the self-driving service.

Figure 15:
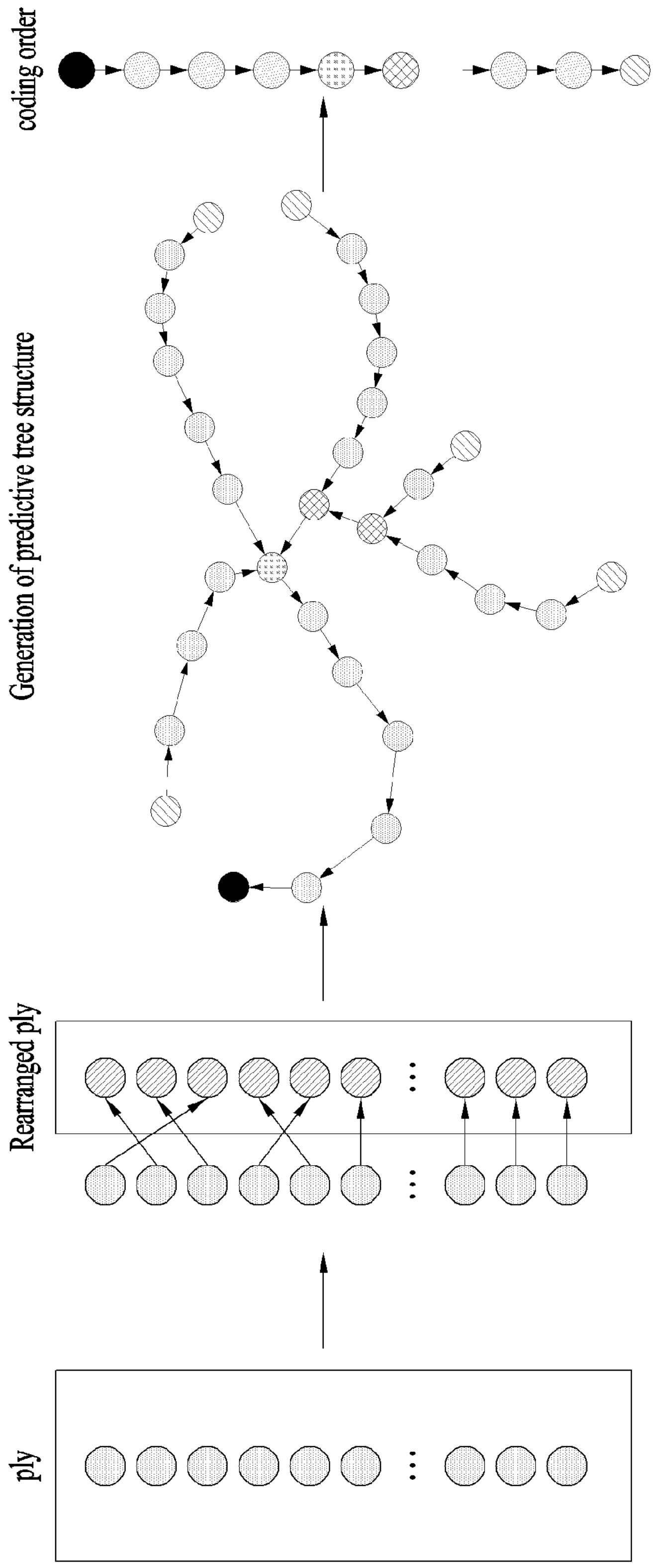
FIG. 15 illustrates an example of generating and encoding a predictive tree structure in a point cloud data transmission method according to embodiments.

FIG. 15 illustrates an example of generating and encoding a position predictive tree structure in a transmission method for point cloud data according to embodiments.

Point cloud data may be acquired (20000) by the point cloud video acquirer 10001 according to the embodiments, and encoded (20001) by the point cloud video encoder 10002 according to the embodiments. Also, the point cloud data may be received or acquired by the data input unit 12000 according to the embodiments. The data input unit 12000 may carry out the same or similar operation and/or acquisition method to the operation and/or acquisition method of the point cloud video acquirer 10001 (or the acquisition process 20000 described with reference to FIG. 2).

Figure 20:
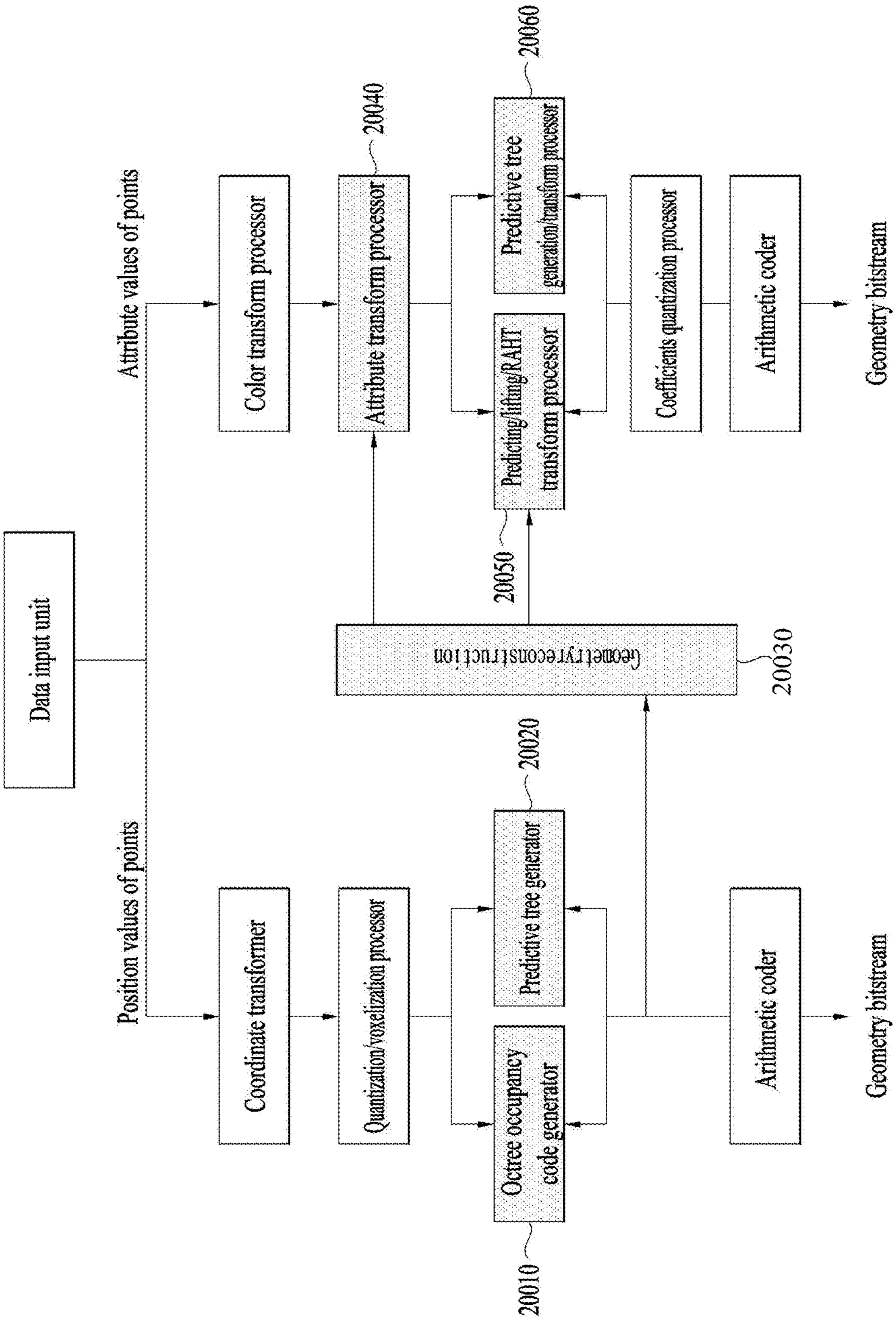
FIG. 20 illustrates an example of a point cloud data transmission device data according to embodiments.

The point cloud data of FIG. 15 may be encoded by the point cloud video encoder 10002 of FIG. 1, the encoding 20001 of FIG. 2, the encoder of FIG. 4, the transmission device of FIG. 12, the XR device 1430 of FIG. 14, the transmission device of FIG. 20, and/or hardware including one or more processors or integrated circuits configured to communicate with one or more memories, software, firmware, or a combination thereof.

The point cloud data may be encoded in the operation of encoding the point cloud data (S2800 in FIG. 28) according to the embodiments, and the encoded point cloud data may be transmitted to the reception device through a bitstream in the operation of transmitting the bitstream (S2810) according to the embodiments. In the reception device 10004 according to the embodiments, the receiver 10005 may receive the bitstream containing the point cloud data (S2900 in FIG. 29), and the point cloud decoder 10006 may decode the received point cloud data (S2910).

The point cloud data is composed of a set of points, and each point may have geometry data (position information) and attribute data (attribute information). The encoding of the point cloud data may include compressing the geometry data and compressing the attribute data based on the geometry data reconstructed with the information changed through the compression. That is, the point cloud data includes the geometry data and the attribute data. The geometry data includes coordinate information (position information or geometry information) about points. The position information about each point may be represented as a coordinate vector, for example, (x, y) in a Cartesian coordinate system or (y, θ) in a cylindrical coordinate system in 2D space, or (x, y, z) in a Cartesian coordinate system, (r, θ, z) a cylindrical coordinate system, or (r, θ, Φ) in a spherical coordinate system in a 3D space.

The attribute data may be a vector (R, G, B) representing the color of a point and/or a vector of values acquired from one or more sensors, such as a brightness value, and/or a reflection coefficient of LiDAR, and/or a temperature value acquired from a thermal imaging camera.

The point cloud data may be divided into Category 1 and Category 3 according to the characteristics thereof. Category 1 data is static data and is composed of one frame. Category 3 data is dynamic data and is composed of N frames or multiple points according to a method. The Category 3 frame data, which has one million or fewer points on average, may be coded/decoded per frame, and is composed of one slice. Accordingly, it may also be composed in a unit of bitstream.

The Category 3 frame data has a lower density of points than static data, and each point thereof has no color value and includes a reflectance value. Category 3 frame data sequences are mainly aimed at low-latency and real-time processing in self-driving. However, in the conventional octree encoding/decoding method, it is difficult to perform low-latency decoding because octree splitting is performed up to a leaf by the decoder. The device/method for transmitting point cloud data according to the embodiments may enable real-time processing of data through predictive tree-based coding and improve coding efficiency.

FIG. 15 illustrates an example of generating and encoding a position predictive tree in predictive tree-based geometry coding. The position predictive tree generation, predicted value calculation, and encoding operations may be performed by the point cloud video encoder 10002 in FIG. 1, the encoding 20001 in FIG. 2, the encoder in FIG. 4, the transmission device in FIG. 12, the XR device 1430 in FIG. 14, the transmission device in FIG. 20, and/or hardware including one or more processors or integrated circuits configured to communicate with one or more memories, software, firmware, or a combination thereof.

The point cloud data transmission device according to the embodiments may include a position predictive tree generator 20020 (FIG. 20) configured to generate a position predictive tree. The position predictive tree (geometry predictive tree) based on geometry data is created in consideration of the relationship between points from the x, y, and z coordinates of the points. The position predictive tree generator 20020 sorts the point cloud data (ply) based on a specific criterion, searches for nearby points based on the sorted points, and calculates a predicted value of a point using predictive modes to generate a position predictive tree. In addition, based on the position predictive tree structure, a predicted position value may be calculated by a prediction equation for each point, and the difference (position residual) between the predicted value and the original value and the position predictive mode may be encoded according to the coding order in the encoding operation. The coded (encoded) point cloud data may be transmitted to the reception device 10004 as a bitstream via the transmitter 10003.

The reception device 10004 according to the embodiments receives the bitstream containing the point cloud data, and the decoder 10006 decodes the encoded point cloud data (20003). The reception device according to the embodiments (see FIG. 21) may include a predictive tree reconstruction processor 21002. The predictive tree reconstruction processor 21002 may receive the bitstream containing the point cloud data, and reconstruct the position values of the points based on the position residual and position predictive mode for each point.

In the point cloud data transmission method according to the embodiments, the encoding of the geometry data may include configuring a position predictive tree with reference to neighbor points (nearby points) based on the geometry data, and encoding a position predictive mode and a position residual based on the position predictive tree. In this case, the configuring of the position predictive tree may include sorting the point cloud data and configuring the position predictive tree.

The configuring of the position predictive tree may be performed by the point cloud video encoder 10002 in FIG. 1, the encoding 20001 in FIG. 2, the encoder in FIG. 4, the transmission device in FIG. 12, the XR device 1430 in FIG. 14, the transmission device in FIG. 20, and/or hardware including one or more processors or integrated circuits configured to communicate with one or more memories, software, firmware, or a combination thereof.

In the sorting of the point cloud data, the point cloud data may be sorted according to Morton order, radius order, azimuth order, or in ascending or descending order along the x, y, or z axis. The order in which point cloud data is sorted may be the order in which points are connected in the position predictive tree. Alternatively, neighbor points for a point pre-registered in the position predictive tree may be searched for in the array of sorted points, and predicted position values calculated by position predictive modes may be compared to connect the searched neighbor points to a position with the smallest position residual. Thereby, the position predictive tree may be configured.

More specifically, the position predictive tree generator 20020 searches for a predetermined number of neighbor points through a kd-tree spatial search algorithm based on the array of sorted points. In addition, the position predictive tree generator 20020 may calculate a predicted position value for the searched nearby nodes through the position predictive modes, and compare the differences (position residuals) between the predicted position values and the original values to connect the searched nearby points to a part with the smallest position residual in the position predictive tree. That is, the position predictive tree generator 20003 may determine a point that has a predicted value that is calculated by a predictive mode are most similar to the original value when the point is connected to the searched neighbor (nearby) points, and then connects the neighbor points to the position predictive tree. In the determination, predicted values for the current point may be calculated by various predictive modes and compared.

Figure 21:
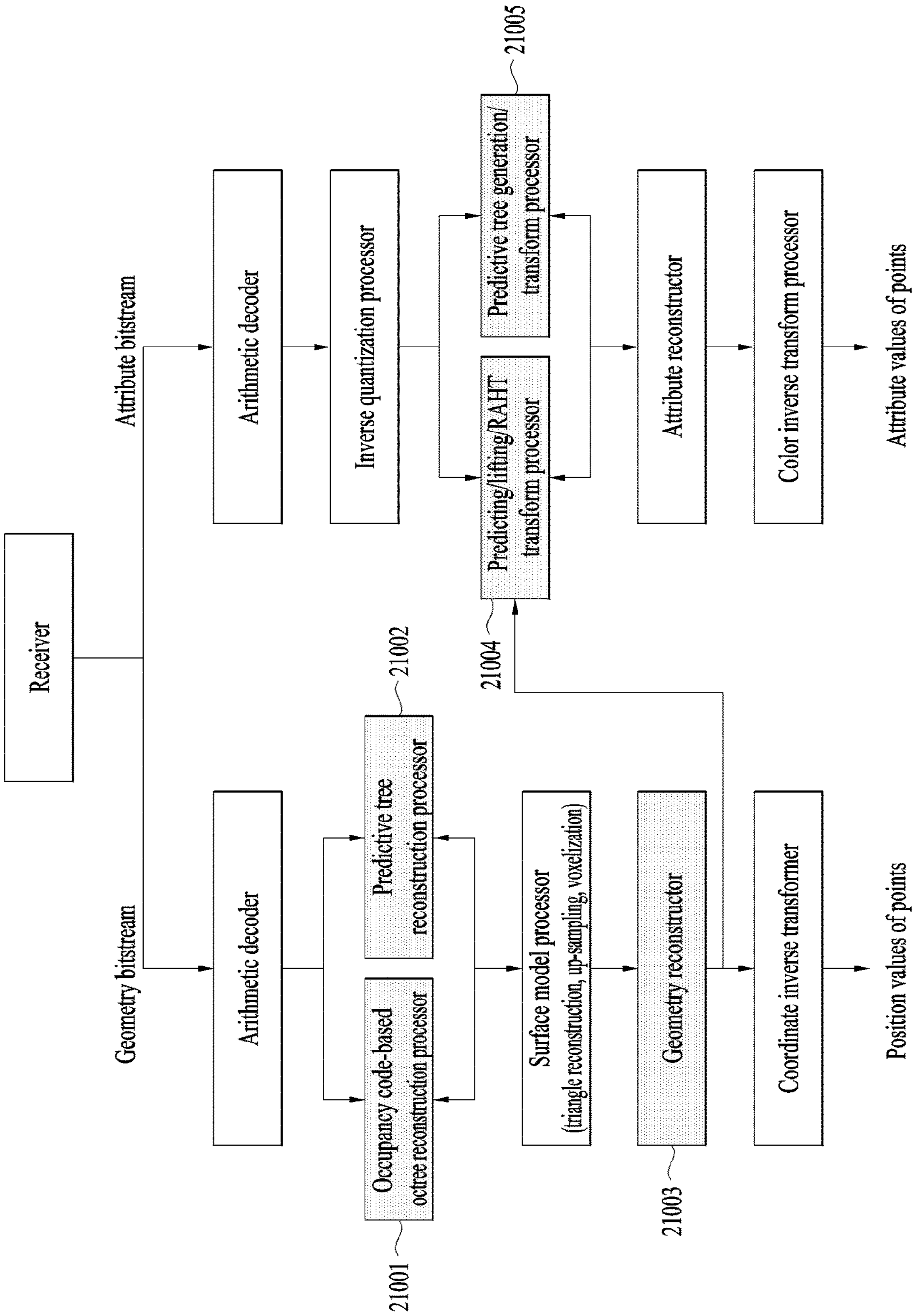
FIG. 21 illustrates an example of a point cloud data reception device according to embodiments.

The transmission device 10000 (FIG. 20) calculates the position residual calculated by the position predictive mode for each point. In addition, a plurality of predicted values calculated by a plurality of position predictive modes for the respective points may be compared, and the position predictive mode having the smallest position residual and the position residual may be transmitted to the reception device 10004 (FIG. 21). That is, one position predictive mode and one position residual per point may be transmitted to the reception device 10004 (FIG. 21), and the reception device 10004 (FIG. 21) may reconstruct the corresponding point based on the received position predictive mode and position residual. For the completed position predictive tree, the coding order may be set based on Depth First Search (DFS) or Breadth First Search (BFS), but is not limited thereto.

In the configuring of the position predictive tree by the position predictive tree generator 20020, the position predictive tree may be configured using three predictive modes for prediction using a parent node p0, a parent-parent node p1, or a parent-parent-parent node p2, and a non-predictive mode. Here, the parent node, parent-parent node, and parent-parent-parent node are configured such that a node connected to the upper layer in the position predictive tree is a parent node, and a node connected to the lower layer is a child node. That is, in the predictive tree, a node n2 connected to the upper layer of a specific node n1 is the parent node n2 of the specific node n1, and the parent node n3 of the parent node n2 is the parent-parent node n3 of the specific node n1. In addition, the parent node n4 of the parent-parent node n3 may be expressed as a parent-parent node n4 of the specific node n1.

The predicted position value p of a node may be calculated based on the position values of the parent node p0 and the parent-parent node p1 or the parent-parent-parent node p2 of the node to be predicted. Hereinafter, position predictive modes for calculating a predicted position value by the position predictive tree generator 20020 according to the embodiments will be described.

A no predictive mode is a mode in which prediction is not performed. Accordingly, (0, 0, 0) is the predicted position value (p). In encoding, x, y, and z values are used as the residual (position residual) between the current node (x, y, z) and the predicted position value. When the no predictive mode is used for a specific point, predictive mode information about the specific point may be delivered as mode 0. The no predictive mode is generally used for a root node that has no parent node. Accordingly, when the predictive mode information is transmitted as mode 0 for a specific node, the reception device 10004 may recognize the node as a root.

In the equation for the delta predictive mode, the predicted position value is calculated based on the parent node p0 (coordinates (x', y', z')) of a node to be predicted. The residual (x'−x, y'−y, z'−z) of the predicted value for the node (coordinate (x, y, z)) may be encoded and transmitted to the reception device 10004. When a predicted value is calculated in the delta predictive mode for a specific point, information about the position predictive mode for the point may be delivered to the reception device 10004 in mode 1.

In the equation for the linear predictive mode, the predicted position value p is calculated based on the residual between the parent p0 (coordinates (x', y', z')) and the parent-parent node p1 (coordinates (x", y", z")) (p=2*p0−p1). Accordingly, the predicted position value p is (2x'−x", 2y'−y", 2z'−z"), and the position residual (2x'−x"−x, 2y'−y"−y, 2z'−z"−z). In addition, once the predicted position value is calculated for a specific point in the linear predictive mode, information about the position predictive mode of the point may be transmitted to the reception device 10004 as mode 2.

In the equation for the parallelogram predictive mode, the predicted value is calculated based on the residual between the parent-parent-parent node p2, the parent-parent node p1, and the parent node p0 (p=p0+p1−p2). When the position values of the parent-parent-parent node p2 are x"', y"', and z"', the position residual of the x value is 2x'+x"−x"'−x, and residuals for the y-axis and z-axis are calculated in the same way. In addition, once the predicted value is calculated for a specific point in the parallelogram predictive mode, information about the position predictive mode of the point may be transmitted to the reception device 10004 as mode 3.

Attribute data may be encoded using predictive transform/lifting transform coding according to a coding order after geometry data is compressed. The predictive transform is a coding condition given when the number of LoDs is 1. The lifting transform is a coding condition given when the number of LoDs is N.

In the point cloud data transmission method according to embodiments, a geometry coding order or other point cloud data sorting order may be applied to attribute coding. In addition, predictive transform/lifting transform may be used or an attribute predictive tree may be generated and applied to the attribute coding. In addition, conditions for generating an attribute predictive tree may be changed. Further, point cloud data may be classified into layers according to laser IDs, and the layers may be arranged and applied to the attribute coding. Depending on the arrangement of the layers, predictive transform or lifting transform may be used for the attribute coding.

In the point cloud data transmission method according to the embodiments, when the attribute coding is used in a low-latency application in connection with the geometry coding, all the geometry data and attribute data may be decoded in real time. In addition, according to the point cloud data transmission method according to the embodiments, neighbor point information found in a position predictive tree of a geometry may be used for the attribute coding.

In the case of octree geometry coding, the order of leaf nodes in the octree corresponds to Morton order, and accordingly the coding order of points is the same as sorting in Morton order. Accordingly, attribute coding may be performed by performing predictive transform or lifting transform in order of the geometry data calculated after the octree geometry coding. Accordingly, the connection relationship of geometry data is reflected in the attribute coding. When predictive tree-based geometry data coding is performed, the coded geometry order is different from that of octree-based geometry coding.

Figure 16:
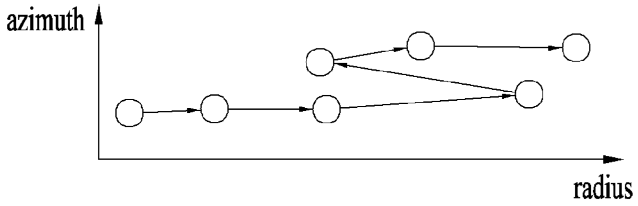
FIG. 16 illustrates an example of searching for a prediction point according to an azimuth order in the point cloud data transmission method according to the embodiments.

FIG. 16 illustrates an example of sorting and coding of point cloud data according to an azimuth order in the point cloud data transmission method according to the embodiments. Arrows in FIG. 16 indicate a coding order. As shown in FIG. 16, when coding is performed according to sorting in a specific criterion (e.g., azimuth order), another point may be searched for first even though there is a point closer in space, and the spatial search direction may not be constant. Accordingly, in the point cloud data transmission method according to embodiments, point cloud data may be re-sorted or a search order in the position predictive tree may be set. In this case, the search order in the position predictive tree is set after geometry data coding is performed. As the search order in the position predictive tree, depth first search (DFS), breadth first search (BFS), preorder traversal, inorder traversal, postorder traversal, or the like may be applied according to compression efficiency.

Figure 17:
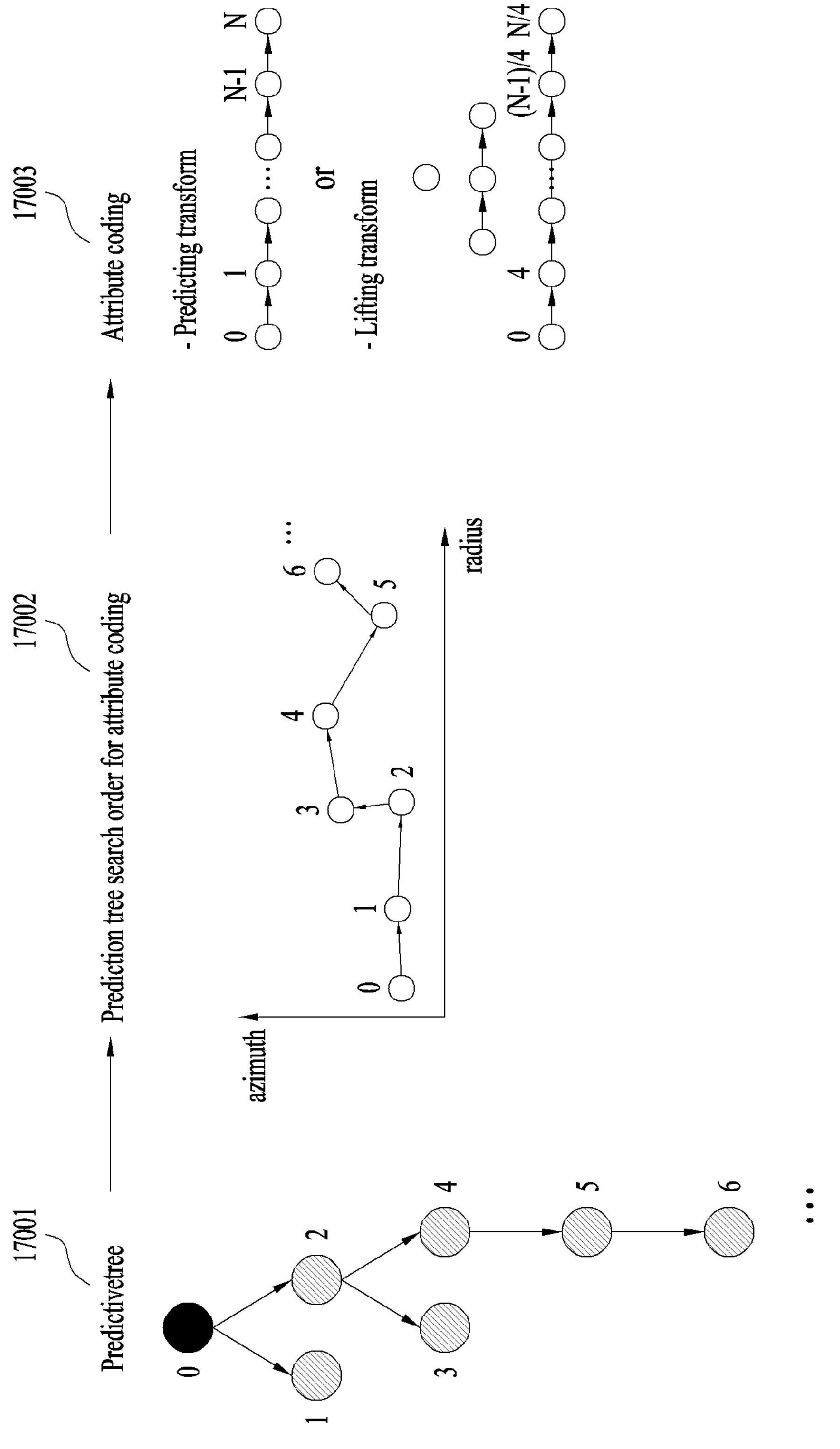
FIG. 17 illustrates an example of searching a predictive tree and coding attribute data in the point cloud data transmission method according to the embodiments.

FIG. 17 illustrates an example of attribute coding (17003) by applying predictive transform or lifting transform based on the order in which point cloud data are sorted by searching (17002) a position predictive tree (17001). As the search order in the position predictive tree shown in FIG. 17, DFS, BFS, preorder traversal, inorder traversal, postorder traversal, or the like may be applied according to compression efficiency. Also, in the point cloud data transmission method according to the embodiments, attribute coding may be performed after re-sorting the point cloud data in an azimuth order, a radius order, or a morton order. For the attribute coding, the predictive transform or lifting transform may be used.

The predictive transform is unfavorable to real-time decoding and parallel decoding within a slice due to issues such as Morton code generation, morton sorting, and the amount of computation for neighbor point search. The Morton code generation and Morton sorting have a computation amount (complexity) of O(n log n) for all points, and neighbor point search is performed with the computation amount of L1 distance O(n) or L2 distance O(n^2). In the method of transmitting/receiving point cloud data according to embodiments, encoding/decoding may be performed using a predictive tree method in attribute coding, just as the predictive tree method is used in geometry coding.

The point cloud data transmission method according to the embodiments may use the order of geometry coding in attribute coding. When the order of geometry coding is not used, the search order in the position predictive tree used for the geometry coding may be set. The search order in the position predictive tree includes DFS, BFS, preorder traversal, inorder traversal, postorder traversal, and/or search orders applicable by those skilled in the art.

In the point cloud data transmission method according to the embodiments, attribute coding may be performed using the same predictive tree as the position predictive tree used for geometry coding. When the same predictive tree as the position predictive tree is used for the attribute coding, the attributes may be coded using the same predictive mode as the predictive mode used in the geometry coding. Alternatively, an attribute predictive mode different from the predictive mode used in the geometry coding may be used.

In the point cloud data transmission method according to the embodiments, when the same predictive tree as the position predictive tree is not used in attribute coding, the point cloud data may be re-sorted to configure an attribute predictive tree based on the attribute values or geometry values (position values). In addition, a predicted attribute value may be calculated using an attribute predictive mode based on the attribute predictive tree, and an attribute residual, which is a difference between the original value of the attribute and the predicted attribute value, may be calculated.

The point cloud data transmission device (FIG. 20) according to the embodiments includes a geometry reconstructor 20030 configured to re-sort point cloud data, and a predictive tree generation/transform processor 20060 configured to generate a predictive tree based on the sorted point cloud data. The predictive tree generation/transform processor 20060 may encode the attribute predictive mode and the attribute residual and transmit the same to the reception device (FIG. 21), and the point cloud data reception device (FIG. 21) may restore the attribute value based on the received data. The geometry reconstructor 20030 of the point cloud data transmission device (FIG. 20) according to the embodiments may correspond to the geometry reconstructor 40005 of FIG. 4.

In encoding and transmitting the point cloud data, the predictive tree generation/transform processor 20050 of the point cloud data transmission device according to the embodiments may encode and transmit the difference between the position predictive mode used in geometry coding and the attribute predictive mode used in attribute coding. For example, when the position predictive mode is 3 and the attribute predictive mode is 2 for a specific point, 1, which is the difference between 3 and 2, may be encoded and transmitted to the reception device. In the same way, the difference between the position residual (difference between the predicted position value and the original value) calculated in the geometry coding and the attribute residual (difference between the predicted attribute value and the original value) calculated in the attribute coding may be encoded and transmitted to the reception device. Also, in the attribute coding, the attribute predictive mode and the attribute residual may be encoded by grouping a plurality of points. In addition, a look up table may be used such that attribute values (e.g., reflectance values) are quantized or have constant values.

In the attribute coding method using the attribute predictive tree, the prediction may be performed on a point-by-point basis, and the attribute predictive mode and the attribute residual may be encoded. In addition, points may be grouped and encoded, and points used for prediction may be defined in various ways.

Figure 18:
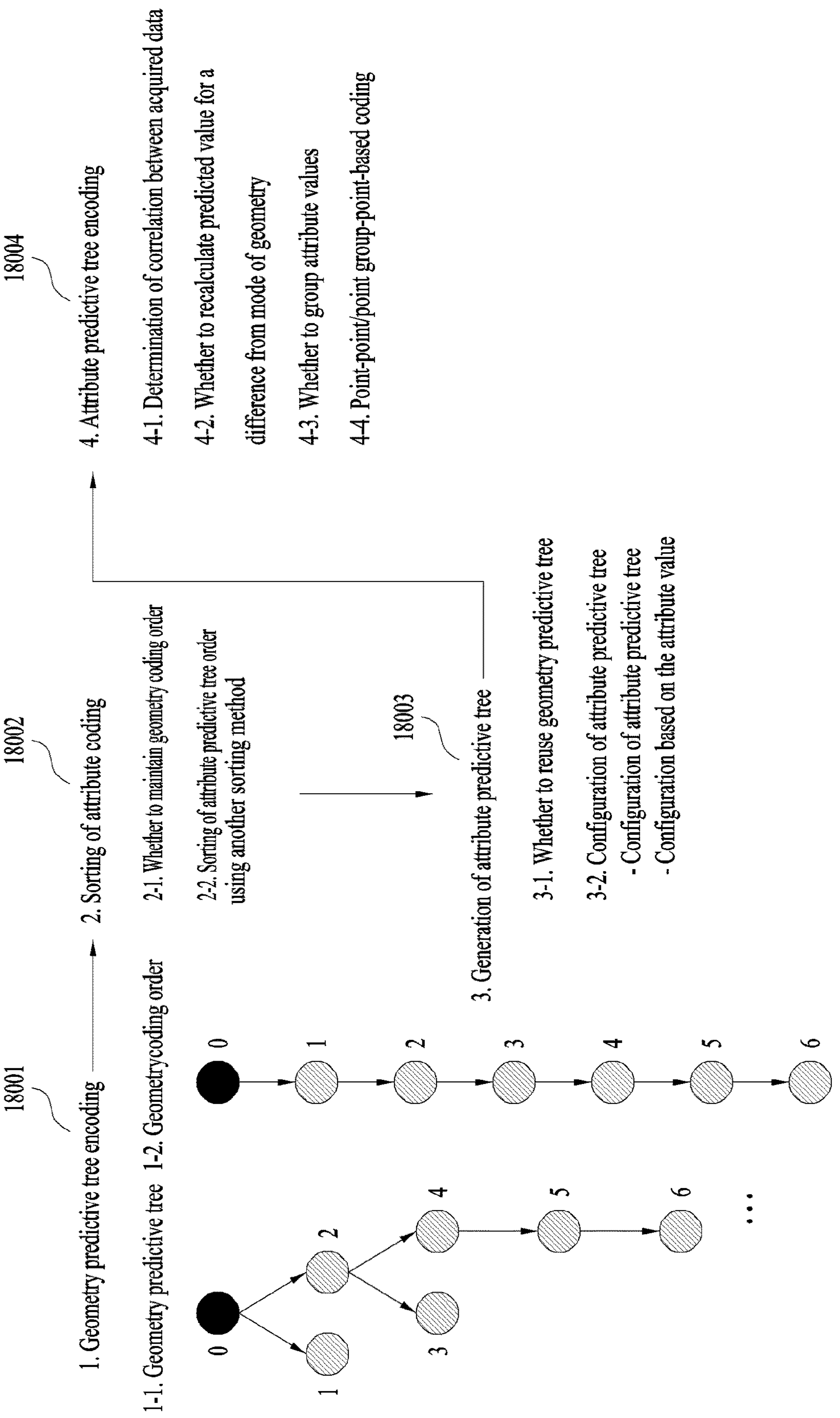
FIG. 18 illustrates an example of a point cloud data transmission method according to embodiments.

FIG. 18 illustrates an example of a point cloud data transmission method according to embodiments. The point cloud data transmission method according to the embodiments includes encoding point cloud data and transmitting a bitstream containing the point cloud data.

The encoding of the point cloud data includes encoding geometry data and encoding attribute data. The encoding of the geometry data includes configuring a position predictive tree with reference to neighbor points based on the geometry data, and encoding a position predictive mode and a position residual based on the position predictive tree (18001 in FIG. 18).

The encoding of the attribute data includes arranging the point cloud data (18002), configuring an attribute predictive tree with reference to neighbor points in the arrangement (18003), and encoding the attribute data (18004).

In operation 18002 of arranging the point cloud data, the coding order of the geometry data may be maintained or the point cloud data may be arranged according to a specific criterion using another sorting method. The sorting method may include an azimuth order, a radius order or a Morton order. In addition, according to the sorting method, the point cloud data may be arranged by searching the position predictive tree generated in the encoding of the geometry data. Methods for searching the position predictive tree include depth first search (DFS), breadth first search (BFS), preorder traversal, inorder traversal, and postorder traversal. Also, the sorting method may include a method of sorting aligning data based on attribute values (color, reflectance, etc.) of the point cloud data.

In operation 18003 of configuring the attribute predictive tree, an attribute predictive tree may be generated based on the point cloud data arranged in operation 18002 of arranging the point cloud data. The attribute predictive tree may be generated based on geometry values (position values) or attribute values. In operation 18003 of configuring the attribute predictive tree, the same predictive tree as the position predictive tree generated in operation 18001 of encoding the geometry data may be used as the attribute predictive tree. When the same predictive tree as the position predictive tree is used as the attribute predictive tree, the same predictive mode as the position predictive mode used in the operation of encoding the geometry data may be used as the attribute predictive mode.

In the operation 18004 of encoding the attribute data, the attribute predictive mode and an attribute residual may be encoded based on the attribute predictive tree. In the encoding operation, the value of a difference (mode difference) between the position predictive mode used in the operation of encoding the geometry data and the attribute predictive mode that is based on the attribute predictive tree may be encoded. Also, in operation 18004 of encoding the attribute data, the value of a difference (residual difference) between the position residual calculated in operation 18001 of encoding the geometry data and the attribute residual may be encoded. Also, in operation 18004 of encoding the attribute data, the point cloud data may be grouped and encoded. Also, in operation 18004 of encoding the attribute data, point cloud data included in one slide or brick may be grouped and encoded or each of the point cloud data may be encoded. Alternatively, both methods may be used in combination.

The encoding of the attribute data may include determining a correlation between the acquired point cloud data. For example, in the case of point cloud data acquired through a LiDAR sensor, a radius and a reflectance may be correlated. Accordingly, in the operation of encoding the attribute data, an attribute predictive tree that is favorable to neighbor node search may be generated in consideration of the correlation.

Figure 18A:
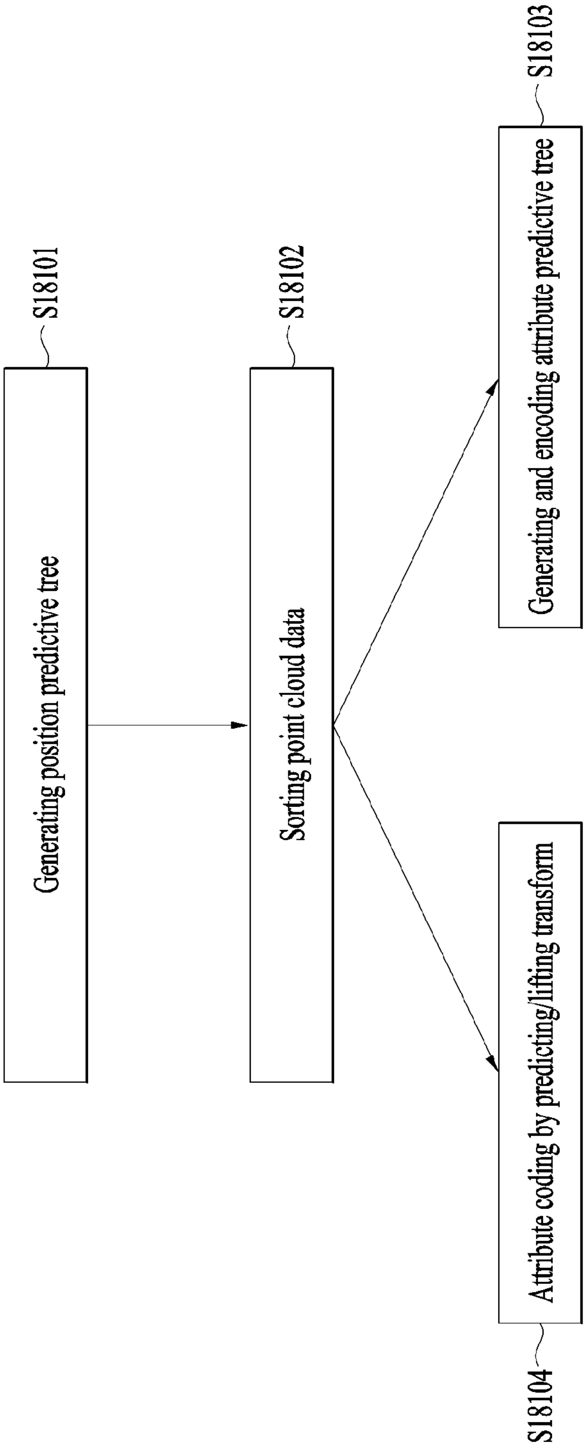
FIG. 18A illustrates an example of a point cloud data transmission method according to embodiments.

FIG. 18A illustrates an example of a point cloud data transmission method according to embodiments. The transmission method (FIG. 18A) may include generating a position predictive tree based on geometry data (S18101), sorting point cloud data (S18102), generating and encoding an attribute predictive tree (S18103), or performing attribute coding by predictive/lifting transform (S18104). Each operation may be performed by the transmission device (FIG. 20). The transmission device (FIG. 20) may include a position predictive tree generator 20020, a geometry reconstructor 20030, an attribute conversion processing unit 20040, a predictive tree generation/transform processor 20060, and a predictive/lifting transform processor 20050.

Operation S18101 of generating a position predictive tree based on the geometry data may be performed by the position predictive tree generator 20020. The position predictive tree generator 20020 may encode a position predictive mode and a predicted position value that have the smallest position residual for a corresponding point based on the generated position predictive tree.

Operation S18102 of searching the point cloud data may be performed by the geometry reconstructor 20030. The geometry reconstructor 20030 is a component that maintains the coding order of the geometry data for attribute coding or re-sorts the point cloud data using another sorting method. The geometry reconstructor 20030 may search the position predictive tree generated by the position predictive tree generator 20020 and sort the point cloud data. Methods for searching the position predictive tree include depth first search (DFS), breadth first search (BFS), preorder traversal, inorder traversal, and postorder traversal. In addition, the geometry reconstructor 20030 may sort the data in an azimuth order, radius order, or Morton order, or based on attribute values (color, reflectance, etc.) of the point cloud data.

Operation S18103 of generating and encoding the attribute predictive tree may be performed by the predictive tree generation/transform processor 20060. The predictive tree generation/transform processor 20060 may generate an attribute predictive tree based on the order of the point cloud data sorted by the geometry reconstructor 20030, and encode an attribute predictive mode and a predicted attribute value that have the smallest attribute residual for the point based on the attribute predictive tree. In the encoding operation, the value of a mode difference, which is the difference between the position predictive mode and the attribute predictive mode, may be encoded, or the value of a residual difference, which is the difference between the position residual and the attribute residual, may be encoded. Mode differences or attribute residuals may be grouped and encoded.

Operation S18104 of performing attribute coding by the predictive/lifting transform may be performed by the predictive/lifting transform processor 20050. The predictive/lifting transform processor 20050 is a component that performs attribute coding of the predictive transform or lifting transform based on the point cloud data sorted by the geometry reconstructor 20030.

The geometry reconstructor 20030 may classify points acquired by lasers of the same laser ID into layers based on spherical coordinate system information about the geometry data, and arrange the layers. In this case, the predictive/lifting transform processor 20050 may encode the attribute data using the predictive transform or the lifting transform according to a method of arranging the layers by the geometry reconstructor 20030.

According to the configuration described above, the point cloud data transmission method according to the embodiments may enable predictive tree-based attribute coding and attribute coding that utilizes a position predictive tree structure by applying various data arrangements, thereby improving the scalability of attribute coding and implementing efficient coding according to data. In addition, scalability may be increased by arranging and coding point cloud data by layer classification/arrangement based on laser ID.

Figure 18B:
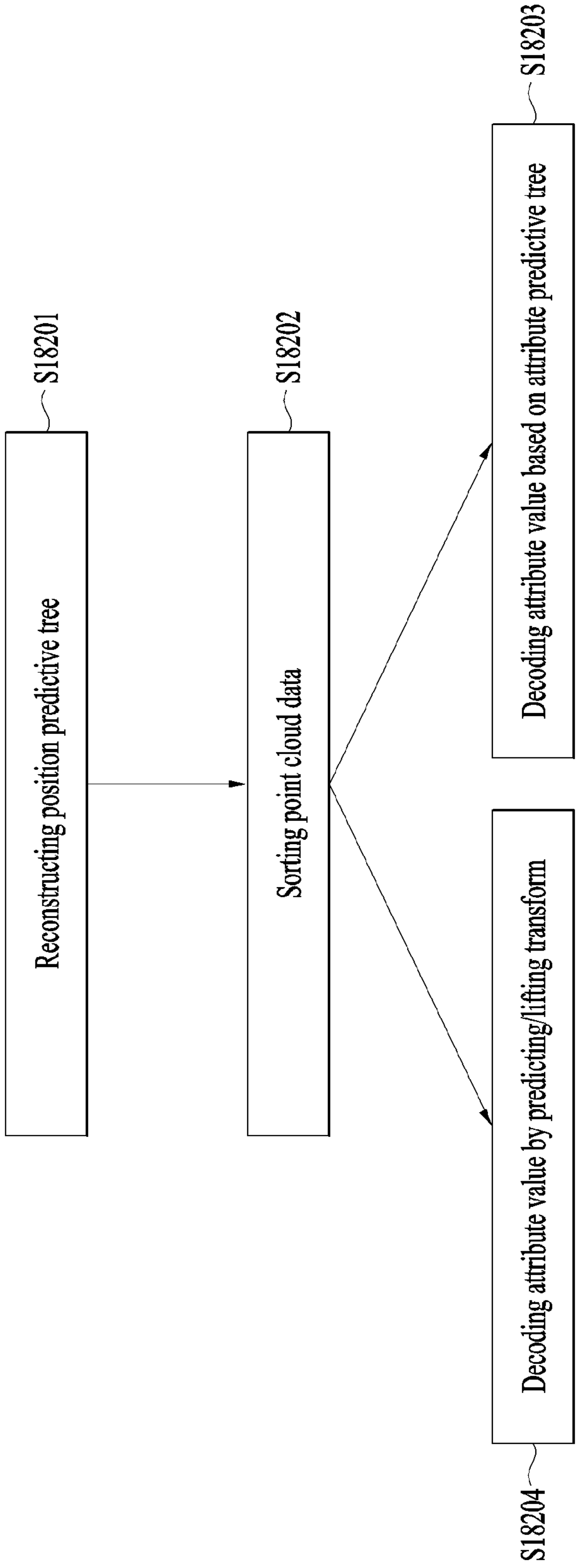
FIG. 18B illustrates an example of a point cloud data reception method according to embodiments.

FIG. 18B illustrates an example of a point cloud data reception method according to embodiments. The reception method (FIG. 18B) may include reconstructing a position predictive tree structure based on received geometry data (S18201), sorting point cloud data (S18202), and decoding attribute values based on an attribute predictive tree (S18203) or decoding the attribute values through predictive/lifting transform (S18204). Each operation in the reception method (FIG. 18B) may be performed by the reception device (FIG. 21). The reception device (FIG. 21) may include a predictive tree reconstruction processor 21002, a geometry reconstructor 21003, a predictive tree generation/transform processor 21005, and a predictive/lifting transform processor 21004.

Operation S18201 of reconstructing the position predictive tree structure based on the received geometry data may be performed by the predictive tree reconstruction processor 21002. The predictive tree reconstruction processor 21002 is a component to reconstruct the position predictive tree structure based on the information delivered from the received bitstream, and reconstruct geometry data based on the reconstructed position predictive tree structure and the delivered information about the position predictive mode and position residual.

Operation S18202 of sorting the point cloud data may be performed by the geometry reconstructor 21003. The geometry reconstructor 21003 is a component to maintain the coding order of the geometry data or re-sort the point cloud data using another sorting method. The geometry reconstructor 21003 may search the position predictive tree reconstructed by the predictive tree reconstruction processor 21002 and sort the point cloud data. Methods for searching the position predictive tree include depth first search (DFS), breadth first search (BFS), preorder traversal, inorder traversal, and postorder traversal. The geometry reconstructor 21003 may sort the data in an azimuth order, radius order, or Morton order, or based on attribute values (color, reflectance, etc.) of the point cloud data. The geometry reconstructor 21003 may receive the sorting order of the point cloud data from the transmission device (FIG. 20) and sort the point cloud data in the same sorting order.

Operation S18203 of decoding the attribute values based on the attribute predictive tree may be performed by the predictive tree generation/transform processor 21005. The predictive tree generation/transform processor 21005 may reconstruct the attribute predictive tree based on the order of the point cloud data sorted by the geometry reconstructor 21003, and decode the attribute data based on the structure of the attribute predictive tree and information about the attribute predictive mode and the predicted attribute value. In the decoding operation, the attribute data may be decoded based on a mode difference, which is a difference between the position predictive mode and the attribute predictive mode, or a residual difference, which is a difference between the position residual and the attribute residual. The attribute data may be decoded based on a grouped mode difference or attribute residual.

Operation S18204 of decoding the attribute values through the predictive/lifting transform may be performed by the predictive/lifting transform processor 21004. This is a component to decode the attribute data through the predictive transform or the lifting transform based on the point cloud data sorted by the geometry reconstructor 21003.

The geometry reconstructor 20030 may classify points acquired by lasers of the same laser ID into layers based on spherical coordinate system information about the geometry data, and arrange the layers. In this case, the predictive/lifting transform processor 21004 may decode the attribute data using predictive transform or the lifting transform according to a method of arranging the layers by the geometry reconstructor 21003.

According to the configuration described above, the point cloud data reception method according to the embodiments may enable predictive tree-based attribute coding and attribute coding that utilizes a position predictive tree structure by applying various data arrangements, thereby improving the scalability of attribute coding and implementing efficient coding according to data. In addition, scalability may be increased by arranging and coding point cloud data by layer classification/arrangement based on laser ID.

Figure 19:
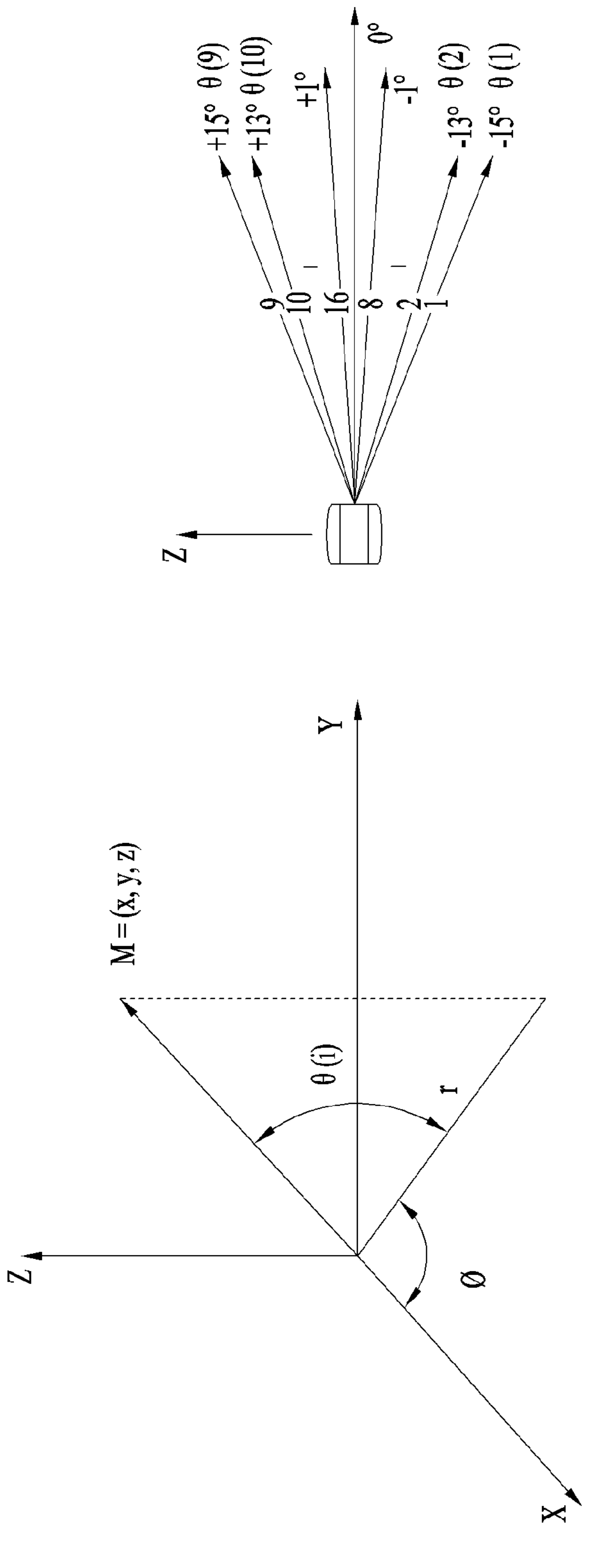
FIG. 19 illustrates presenting point cloud data in a spatial coordinate system and a spherical coordinate system according to embodiments.

FIG. 19 illustrates presenting point cloud data in a spatial coordinate system and a spherical coordinate system according to embodiments. In the spatial coordinate system, the position of the point cloud data may be expressed as (x, y, z). In the spherical coordinate system, the position of the point cloud data may be expressed as (r, Φ, θ).

In FIG. 19, the right part shows that a plurality of lasers is emitted from a LiDAR sensor to acquire points. Different laser IDs are given to the lasers, respectively, and the emission angles of the lasers are different from each other. In the illustrated case, 16 lasers are emitted. The point cloud data transmission device (FIG. 20) according to the embodiments may classify points acquired by a laser of the same laser ID as one layer. Alternatively, after converting the position values of the points into spherical coordinates, points acquired by the same laser may be inferred through the converted position values. For example, since the lasers are emitted at different emission angles, points having the same value of θ in the spherical coordinate system may be classified as one layer. The point cloud data transmission device (FIG. 20) according to the embodiments may include an attribute transform processor 20040. In the point cloud data transmission device (FIG. 20) according to embodiments, the attribute transform processor 20040 or the geometry reconstructor 20030 may classify acquired points into layers and properly arrange the same.

When there are N laser IDs, N layers may be created. In this case, the points included in the N layers may be arranged, and attribute coding may be performed using the predictive transform or the lifting transform. When the points included in N layers are arranged in one dimension, the attribute coding may be performed using the predictive transform. When the N layers are treed in a concept similar to N LoDs, the attribute coding may be performed using the lifting transform. In this case, when there are n+1 layers from layer 0 to layer N, the layers may be configured such that the layer of a greater number includes more points. For example, the number of points acquired from a road is greater than the number of points acquired from an object. These layers may be sorted (arranged) according to the number of points, and attribute coding may be performed through the lifting transform based on the sorted (arranged) layers, as in attribute coding through the lifting transform using LoDs. That is, attribute coding may be performed using the predictive transform or lifting transform depending on the method of arranging the layers.

In the point cloud data transmission device (FIG. 20) according to the embodiments, the attribute transform processor 20040 or the geometry reconstructor 20030 may integrate a plurality of layers into one layer or device one layer into a plurality of layers, depending on the number of points included in one layer. In addition, attribute coding may be performed by generating a predictive tree for each layer.

FIG. 20 illustrates an example of a point cloud data transmission device data according to embodiments. The transmission device of FIG. 20 is an example of the transmission device 10000 of FIG. 1 (or the point cloud encoder of FIG. 4), and may carry out at least one of the same or similar operations and methods to the operations and encoding methods of the point cloud encoder described with reference to FIGS. 1 to 9.

Each component of the transmission device of FIG. 20 may correspond to hardware including one or more processors or integrated circuits configured to communicate with one or more memories, software, firmware, or a combination thereof.

The point cloud data transmission device according to the embodiments may include an octree occupancy code generator 20010 or a position predictive tree generator 20020.

The octree occupancy code generator 20010 or the position predictive tree generator 20020 encodes the geometry data in geometry data encoding. The octree occupancy code generator 20010 encodes the geometry data based on the octree, and the position predictive tree generator 20020 generates a position predictive tree and encodes a position predictive mode and a position residual based on the position predictive tree. In this regard, a geometry coding method (geometry_coding_type) may be transmitted to the reception device (decoder) such that the reception device (decoder) may recognize information about the coded geometry order.

The point cloud data transmission device according to the embodiments may further include a geometry reconstructor 20030. The geometry reconstructor 20030 may re-sort the point cloud data for attribute coding or may use the same order as the coded geometry order. The geometry reconstructor 20030 signals whether to use the same coded geometry order (coded_geometry_order_use_flag). In the case where the coded geometry order is not used, the point cloud data may be sorted in azimuth order, radius order, morton order, x-axis order, y-axis order, or z-axis order. The geometry reconstructor 20030 may sort the point cloud data in order of searching the position predictive tree (DFS, BFS, preorder traversal, etc.) or sort the same based on attribute values. The sorting method (Sorting_order) selected by the geometry reconstructor 20030 is signaled to the reception device (decoder).

The point cloud data transmission device according to the embodiments may include an attribute transform processor 20040. The attribute transform processor 20040 may classify point cloud data into layers. The layers may be classified by laser ID or the order of grouped geometry data. The attribute transform processor 20040 may classify the point cloud data acquired with the same laser ID as a layer based on the spherical coordinate system of the point cloud data.

In addition, the attribute transform processor 20040 may signal the number of generated layers (attribute_layer_num) and layer division/integration flag information (attribute_layer_refine_flag) for each layer. In addition, the attribute transform processor signals an attribute encoding method (attribute_encode_type), such as predictive transform, lifting transform, or a method using a predictive tree. The functions of the attribute transform processor 20040 described above may be integrated with the geometry reconstructor 20030.

In addition, the point cloud data transmission device according to the embodiments may include a predictive/lifting transform processor 20050 and a predictive tree generation/transform processor 20060.

The predictive/lifting transform processor 20050 may encode attribute values using the predictive transform or lifting transform on a layer-by-layer basis according to the attribute coding method determined by the attribute transform processor 20040.

The predictive tree generation/transform processor 20060 may encode an attribute value using an attribute predictive tree according to the attribute coding method determined by the attribute transform processor 20040. The predictive tree generation/transform processor 20060 may determine whether to use the same predictive tree as the position predictive tree used for geometry coding (attribute_geometry_predictive_tree_use_flag). In the case where the same predictive tree as the position predictive tree is used, the processor may determine whether to use the same predictive mode as the position predictive mode used for geometry coding (geometry_predictive_mode_use_flag). In the case where the position predictive tree is not used, whether to generate an attribute predictive tree based on the geometry data or the attribute data (attribute_predictive_tree_generation_mode) may be defined. In addition, when the attribute data is encoded, whether attribute predictive mode is grouped (attribute_predictive_mode_grouping_flag) may be defined.

The attribute data encoded through the attribute transform processor 20040, the predictive/lifting transform processor 20050, or the predictive tree generation/transform processor 20060 may be transmitted in an attribute bitstream.

According to the configuration described above, the point cloud data transmission device according to the embodiments may perform predictive tree-based attribute coding and attribute coding that utilizes a position predictive tree structure by applying various data arrangements, thereby improving the scalability of attribute coding and implementing efficient coding according to data. In addition, scalability of attribute coding may be increased by arranging and coding point cloud data by layer classification/arrangement based on laser ID.

FIG. 21 illustrates an example of a point cloud data reception device according to embodiments. The reception device of FIG. 21 may correspond to the reception device 10004 of FIG. 1 and may perform the decoding 20003 of FIG. 2. In addition, the reception device illustrated in FIG. 21 may carry out at least one of operations and methods identical or similar to the operations and decoding methods of the point cloud decoder described with reference to FIGS. 1 to 11.

The reception device 10004 receives a bitstream containing point cloud data, and the decoder 10006 performs decoding 20003 on the encoded point cloud data. The reception device (see 21001 in FIG. 21) according to the embodiments may receive a bitstream containing point cloud data and reconstruct a position value of a point through a position residual and a position predictive mode for each point.

The point cloud data reception device according to the embodiments may include an octree reconstruction processor 21001, a predictive tree reconstruction processor 21002, or a geometry reconstructor 21003. The point cloud data reception device decodes the geometry data through the octree reconstruction processor 21001 or the predictive tree reconstruction processor 21002 based on information about a geometry coding method (geometry_coding_type) received from a transmission device according to embodiments.

The geometry reconstructor 21003 sorts the point cloud data based on information (coded_geometry_order_use_flag) indicating whether to use the received coded geometry order and a data sorting method (Sorting_order). In addition, layers may be reconstructed based on the received number of layers (attribute_layer_num) and the layer division/integration flag information (attribute_layer_refine_flag). In addition, the predictive/lifting transform processor 21004 or the predictive tree generation/transform processor 21005 may decode the attribute data based on the received attribute encoding method (attribute_encode_type).

The point cloud data reception device according to the embodiments may correspond to or be coupled with a point cloud video decoder (FIG. 1), a point cloud decoder (FIGS. 11 and 12), a decoding process (FIG. 2), or component(s) thereof (FIG. 14).

In the point cloud data transmission method according to the embodiments, information indicating whether predictive tree-based coding is used may be delivered to the reception device. Parameters (metadata, signaling information, etc.) according to embodiments may be generated in the process of transmitting the point cloud data, and transmitted to the point cloud data reception device 10004 (FIG. 21). They may be used in reconstructing the point cloud data. For example, the parameters may be generated by the metadata processor (or metadata generator) 12007 of the point cloud data transmission device according to the embodiments, and acquired by the data parser 13006 of the point cloud data reception device according to the embodiments.

According to the configuration described above, the point cloud data reception device according to the embodiments may enable predictive tree-based attribute decoding and attribute decoding that utilizes a position predictive tree structure by applying various data arrangements, thereby improving the scalability of attribute coding and implementing efficient encoding/decoding according to data. In addition, scalability of attribute coding may be increased by arranging and coding point cloud data by layer classification/arrangement based on laser ID.

Figure 22:
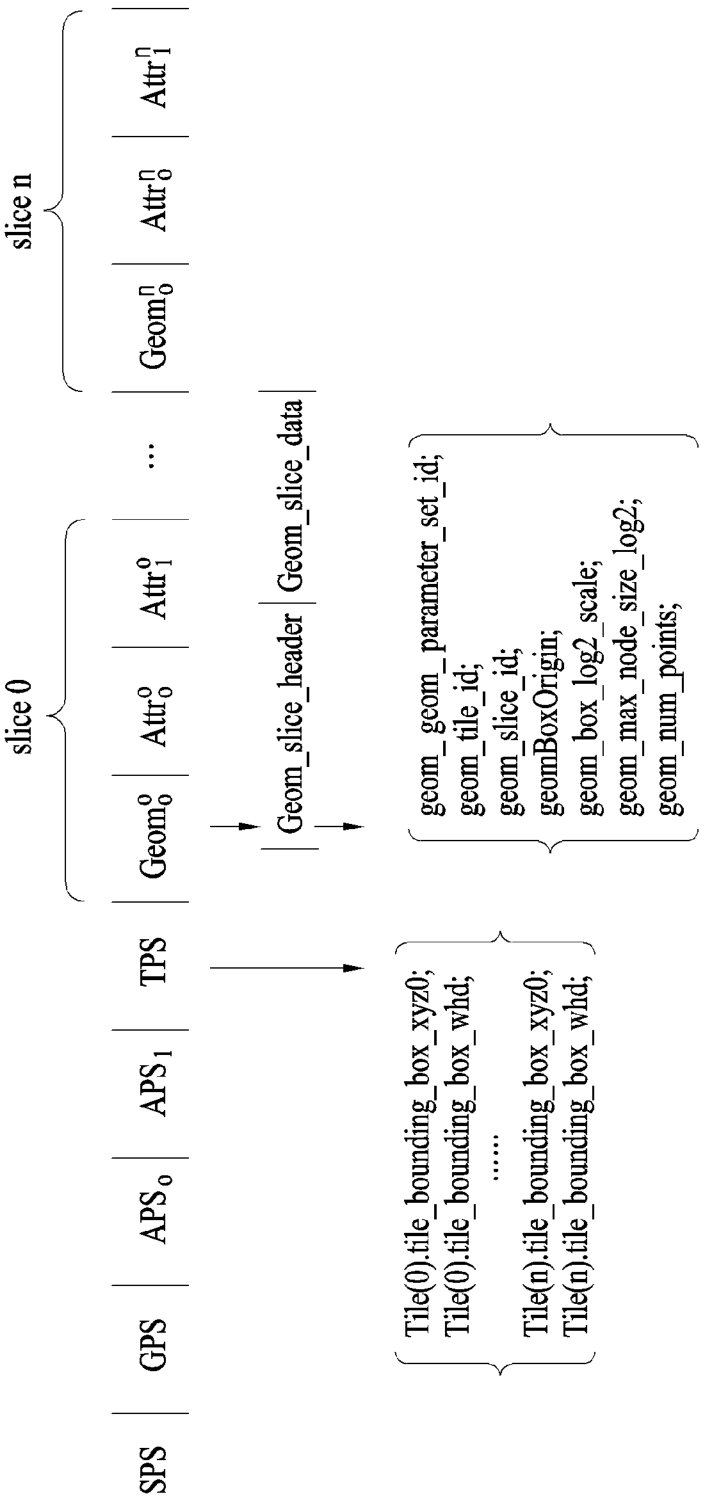
FIG. 22 illustrates an example of encoded point cloud data according to embodiments.

FIG. 22 illustrates an example of encoded point cloud data according to embodiments. The point cloud video encoder 10002 according to the embodiments may encode point cloud data in the encoding 20001, and the transmitter 10003 according to the embodiments may transmit a bitstream containing the encoded point cloud data to the reception device 10004.

The encoded point cloud data (bitstream) may be generated by the point cloud video encoder 10002 in FIG. 1, the encoding 20001 in FIG. 2, the encoder in FIG. 4, the transmission device in FIG. 12, the XR device 1430 in FIG. 14, the transmission device of FIG. 20, and/or hardware including one or more processors or integrated circuits configured to communicate with one or more memories, software, firmware, or a combination thereof.

In addition, the encoded point cloud data (bitstream) may be decoded by the point cloud video decoder 10006 in FIG. 1, the decoding 20003 in FIG. 2, the decoder in FIG. 11, the reception device in FIG. 13, the XR device 1430 in FIG. 14, the reception device in FIG. 21, and/or hardware including one or more processors or integrated circuits configured to communicate with one or more memories, software, firmware, or a combination thereof.

In order to encode/decode attribute data, the point cloud data transmission device according to the embodiments may signal information about a method of encoding/decoding attribute data to the point cloud data reception device according to the embodiments.

The abbreviations shown in FIG. 22 have the following meanings.

SPS: Sequence Parameter Set;

GPS: Geometry Parameter Set;

APS: Attribute Parameter Set;

TPS: Tile Parameter Set;

Geom: Geometry bitstream=geometry slice header+geometry slice data;

Attr: Attribute bitstream=attribute brick header+attribute brick data.

Tiles or slices may be provided such that the point cloud data may be divided into regions and processed. When the point cloud data is divided into regions, the importance of each region may be set differently. Accordingly, by allowing different filters or different filter units to be applied according to importance, a filtering method having high complexity but good result quality may be used for an important region.

In addition, instead of using a complex filtering method for the entire point cloud data, a different filtering method may be applied to each region (divided into tiles or slices) depending on the processing capacity of the reception device. Therefore, an improved image quality for important regions and appropriate latency for the system may be ensured. That is, when the region of the point cloud data is divided into tiles, a different filter or a different filter unit may be applied to each tile. Also, when the region of the point cloud data is divided into slices, a different filter or a different filter unit may be applied to each slice.

The point cloud data transmission device according to the embodiments may add information about an attribute-based predictive tree encoding/decoding method to each parameter set and signal the same to the point cloud data reception device according to the embodiments.

FIG. 23 shows an example of a syntax of a sequence parameter set according to embodiments. Information about a method of encoding/decoding attribute data may be included in the SPS and signaled.

geometry_coding_type indicates a geometry coding method used in geometry coding (0=Octree geometry coding; 1=Predictive geometry coding; 2=Trisoup geometry coding; 3=Other geometry coding methods).

coded_geometry_order_use_flag indicates whether the geometry reconstructor is to use the same coded geometry order.

sorting_order indicates information about a criterion for sorting of point cloud data: 0 may indicate Morton order, 1 may indicate azimuth order, 2 may indicate radius order, 3 may indicate xy-axis based order, and 4 may indicate other sorting methods.

In addition, parameters related to the sequence may be further included in the SPS and transmitted.

FIG. 24 shows an example of a syntax of a tile parameter set according to embodiments. Information about a method of encoding/decoding attribute data may be included in the TPS and signaled.

predictive_tree_geometry_coding_flag indicates whether a tree-based predictive tree coding technique is applied in geometry coding (true=predictive tree technique used; false=predictive tree technique not used).

sorting_order indicates information about a criterion for sorting of point cloud data: 0 may indicate Morton order, 1 may indicate azimuth order, 2 may indicate radius order, 3 may indicate xy-axis based order, and 4 may indicate other sorting methods.

use_root_prediction_mode0 indicates whether to signal root node signaling as a mode (true=signaling as mode 0; false=signaling as index).

prediction_method signals the values of $\alpha$, $\beta$, and $\gamma$ used for a prediction calculation value: 0=adaptive_quadran_pred_method.

In addition, parameters related to tiles may be further included in the TPS and transmitted.

FIG. 25 shows an example of a syntax of a geometry parameter set according to embodiments. Information about a method of encoding/decoding attribute data may be included in the GPS and signaled.

geometry_coding_type indicates a geometry coding method used in geometry coding (0=Octree geometry coding; 1=Predictive geometry coding; 2=Trisoup geometry coding; 3=Other geometry coding methods).

coded_geometry_order_use_flag indicates whether the geometry reconstructor is to use the same coded geometry order.

sorting_order indicates information about a criterion for sorting of point cloud data: 0 may indicate Morton order, 1 may indicate azimuth order, 2 may indicate radius order, 3 may indicate xy-axis based order, and 4 may indicate other sorting methods.

In addition, parameters related to geometry may be further included in the GPS and transmitted.

FIG. 26 shows an example of a syntax of an attribute parameter set according to embodiments. Information about a method of encoding/decoding attribute data may be included in the APS and signaled.

attribute_layer_num indicates the number of layers generated by the attribute transformer.

attribute_layer_refine_flag indicates whether layers sorted by the geometry reconstructor are divided/integrated for each layer.

attribute_encode_type indicates whether to encode an attribute value using predictive transform, lifting transform, or a predictive tree.

attribute_geometry_predictive_tree_use_flag indicates whether the predictive tree generation/transform processor is to use the same predictive tree as the geometry position predictive tree according to attribute_encode_type.

geomtry_predictive_mode_use_flag indicates whether to use the same mode as the geometry position predictive mode when the same predictive tree as the geometry position predictive tree is used.

attribute_predictive_tree_generation_mode indicates whether to generate a predictive tree based on geometry data or attribute data when the same predictive tree as the geometry position predictive tree is not used.

attribute_predictive_mode_grouping_flag indicates whether to group and encode attribute predictive modes of attribute values.

In addition, parameters related to attributes may be further included in the APS and transmitted.

FIG. 27 shows an example of a syntax of a slice header of a geometry bitstream according to embodiments. Information about a method of encoding/decoding attribute data may be included in the slice header of Geom and signaled.

geometry_coding_type indicates a geometry coding method used in geometry coding (0=Octree geometry coding; 1=Predictive geometry coding; 2=Trisoup geometry coding; 3=Other geometry coding methods).

coded_geometry_order_use_flag indicates whether the geometry reconstructor is to use the same coded geometry order.

sorting_order indicates information about a criterion for sorting of point cloud data: 0 may indicate Morton order, 1 may indicate azimuth order, 2 may indicate radius order, 3 may indicate xy-axis based order, and 4 may indicate other sorting methods.

In addition, parameters related to the geometry slice may be further included in the slice header of Geom and transmitted.

A method/device for receiving point cloud data according to embodiments may reconstruct point cloud data with low latency based on signaling information contained in a point cloud bitstream according to embodiments.

Figure 28:
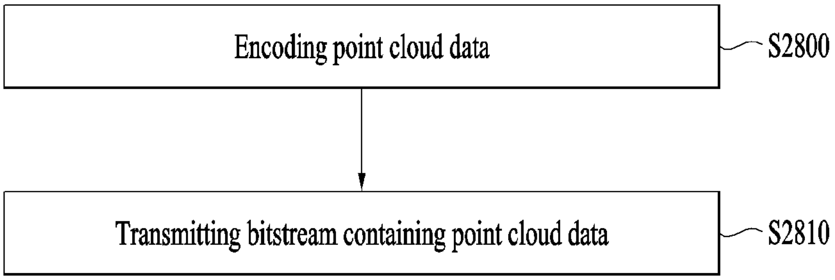
FIG. 28 illustrates an example of a point cloud data transmission method according to embodiments.

FIG. 28 illustrates an example of a point cloud data transmission method according to embodiments. The transmission device 10000 according to the embodiments may include encoding point cloud data (S2800) and transmitting a bitstream containing the point cloud data (S2810).

In operation S2900 of encoding the point cloud data, the point cloud data may be encoded by the point cloud video encoder 10002 in FIG. 1, the encoding 20001 in FIG. 2, the encoder in FIG. 4, the transmission device in FIG. 12, the XR device 1430 in FIG. 14, the transmission device in FIG. 20, and/or hardware including one or more processors or integrated circuits configured to communicate with one or more memories, software, firmware, or a combination thereof.

More specifically, operation S2800 of encoding the point cloud data may include encoding geometry data of the point cloud data and encoding attribute data of the point cloud data.

The encoding of the geometry data includes configuring a position predictive tree with reference to a neighbor point based on the geometry data, and encoding a position predictive mode and a position residual based on the position predictive tree. The operation of encoding the geometry data based on the predictive tree may be performed by the position predictive tree generator 20020 of the transmission device of FIG. 20.

The operation of encoding the attribute data includes sorting the point cloud data according to a specific criterion, configuring an attribute predictive tree with reference to a neighbor point based on the attribute data or the geometry data in the sorted point cloud data, and attribute predictive tree, and encoding an attribute predictive mode and an attribute residual based on the attribute predictive tree.

More specifically, in the operation of sorting the point cloud data according to the specific criterion, the point cloud data may be sorted based on an order in which a position predictive tree is searched. The order in which a position predictive tree is searched includes depth first search (DFS), breadth first search (BFS), preorder traversal, inorder traversal, and postorder traversal. Alternatively, in the operation of sorting the point cloud data according to the specific criterion, the point cloud data may be sorted according to an azimuth order, radius order, Morton order, or the xyz axis based on the geometry data. Alternatively, in the operation of sorting the point cloud data according to the specific criterion, the point cloud data may be sorted based on a color or reflectance value based on the attribute data.

In addition, in the operation of encoding the attribute predictive mode and the attribute residual based on the attribute predictive tree in the operation of encoding the attribute data, the mode difference between the position predictive mode and the attribute predictive mode may be encoded, or the residual difference between the position residual and the attribute residual may be encoded. In this case, in the encoding operation, the mode difference and the residual difference may be grouped and encoded.

The encoding of the attribute data includes converting the geometry information about the point cloud data into spherical coordinates, classifying points having the same laser ID into the same layer based on the spherical coordinate information about the point cloud data, and arranging the layers. Here, in the operation of arranging the layers, the layers may be arranged in a row according to the order, or layers having a relatively small number of points may be arranged in a stacked manner. When the layers are arranged in a row, the attribute data may be encoded using the predictive transform. When the layers having a relatively small number of points are arranged in a stacked manner, the attribute data may be encoded using the lifting transform.

Figure 29:
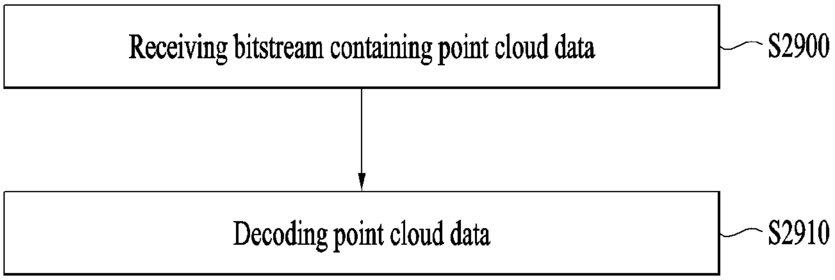
FIG. 29 illustrates an example of a point cloud data reception method according to embodiments.

Operation S2810 of transmitting the bitstream containing the point cloud data includes the transmitter 10003 of FIG. 1 is a step of transmitting the point cloud data as in the transmission 20002 of FIG. 2 by the transmitter 10003 in FIG. 1, the transmission processor 12012 in FIG. 12, the XR device 1430 in FIG. 14, and/or hardware including one or more processors or integrated circuits configured to communicate with one or more memories, software, firmware, or a combination thereof FIG. 29 illustrates an example of a point cloud data reception method according to embodiments. The reception method may include receiving a bitstream containing point cloud data (S2900) and decoding the point cloud data (S2910).

In operation S2900 of receiving the bitstream containing the point cloud data, the point cloud data is received by the reception device 10004 in FIG. 1, the reception device in FIGS. 10 and 11, the receiver 13000 in FIG. 13, the XR device 1430 in FIG. 14, the receiver in FIG. 21, and/or hardware including one or more processors or integrated circuits configured to communicate with one or more memories, software, firmware, or a combination thereof.

In operation S2910 of decoding the point cloud data, the point cloud data is decoded by the point cloud video decoder 10006 in FIG. 1, the reception device in FIGS. 10, 11, the receiver 13000 in FIG. 13, the XR device 1430 in FIG. 14, the receiver in FIG. 21, and/or hardware including one or more processors or integrated circuits configured to communicate with one or more memories, software, firmware, or a combination thereof.

The decoding of the point cloud data may include decoding geometry data of the point cloud data and decoding attribute data of the point cloud data.

In the decoding of the geometry data of the point cloud data, the geometry data is reconstructed based on position predictive mode information for each point and difference value (position residual) information about a predicted position value.

More specifically, the decoding of the geometry data of the point cloud data includes reconstructing a position predictive tree structure based on the geometry data and decoding the geometry data.

In the operation of reconstructing the position predictive tree structure, the position predictive tree structure is identified based on the received bitstream. In the decoding of the geometry data, the geometry data is reconstructed based on the identified position predictive tree structure, the position predictive mode, and the position residual. The above-described function may be performed by the predictive tree reconstruction processor 21002 of the point cloud data reception device (FIG. 21) according to the embodiments.

The decoding of the attribute data of the point cloud data may include sorting the point cloud data, configuring an attribute predictive tree based on the sorted point cloud data, and decoding the attribute data based on a structure of the attribute predictive tree, an attribute predictive mode, and the attribute residual.

In this case, the sorting of the point cloud data may include sorting the point cloud data based on an order in which the position predictive tree is searched. For the search order of the position predictive tree, DFS, BFS, preorder traversal, inorder traversal, and postorder traversal may be applied. In addition, in the sorting of the point cloud data, the point cloud data may be sorted in an azimuth order, a radius order, or a Morton order based on the geometry data. In addition, in the operation of sorting the point cloud data, information about the method of sorting the data by the geometry reconstructor 20030 is received from the point cloud transmission device (FIG. 20) according to the embodiments, and the data may be sorted in the same order. The above-described function may be performed by the geometry reconstructor 21003 in the point cloud reception device (FIG. 21).

The decoding of the attribute data may include decoding the attribute data based on the mode difference between the position predictive mode and the attribute predictive mode, and decoding the attribute data based on the residual difference between the position residual and the attribute residual. In this case, the decoding of the attribute data may include decoding the attribute data based on a grouped mode difference and a grouped residual difference.

In addition, the decoding of the attribute data may include classifying points acquired with lasers of the same laser ID into the same layer based on the spherical coordinate information about the geometry data of the point cloud data, arranging the layer, and decoding the attribute data using predictive transform or lifting transform according to the arrangement.

The reception device according to the embodiments may receive, decode and render the point cloud data by the reception device 10004 in FIG. 1, the reception device in FIG. 11, FIG. 13, the XR device 1430 in FIG. 14, FIG. 21, and/or hardware including one or more processors or integrated circuits configured to communicate with one or more memories, software, firmware, or a combination thereof.

The reception device according to the embodiments includes a receiver configured to receive point cloud data, a decoder configured to decode the point cloud data, and a renderer configured to render the point cloud data.

The receiver may receive geometry data of the point cloud data and attribute data of the point cloud data. In addition, the receiver may receive information about a root node generated based on index information according to a coding order, and information about a position predictive mode, a predicted position, and a position residual used to calculate a predicted value of the point cloud data.

The decoder may include a predictive tree reconstruction processor 21002, an octree reconstruction processor 21001, a geometry reconstructor 21003, an attribute transform processor (not shown), a predictive/lifting transform processor 21004, or a predictive tree generation/transform processor 21005.

The predictive tree reconstruction processor 21002 may reconstruct a position predictive tree based on geometry data and decode the geometry data based on the structure of the position predictive tree, the position predictive mode, and the position residual.

The octree reconstruction processor 21001 may decode the geometry data by reconstructing an octree code for the geometry data encoded based on the octree.

The geometry reconstructor 21003 may sort the received point cloud data. In this case, the point cloud data may be sorted based on the order in which the position predictive tree is searched. For the search order of the position predictive tree, DFS, BFS, preorder traversal, inorder traversal, and postorder traversal may be applied. In addition, the point cloud data may be sorted in an azimuth order, a radius order, or a Morton order.

In addition, the geometry reconstructor 21003 of the reception device (FIG. 21) may receive information about the data sorting order from the point cloud transmission device (FIG. 20) according to the embodiments and sort the data in the same order.

The predictive tree generation/transform processor 21005 may reconstruct the attribute predictive tree based on the point cloud data sorted by the geometry reconstructor 21003, and generate the attribute data based on the structure of the attribute predictive tree, the attribute predictive mode, and the attribute residual.

The predictive tree generation/transform processor 21005 may decode the attribute data based on the mode difference between the position predictive mode and the attribute predictive mode. In addition, the predictive tree generation/transform processor 21005 may decode the attribute data based on the residual difference, which is a difference between the position residual and the attribute residual. The mode difference or the residual difference may be a grouped difference. In this case, the predictive tree generation/transform processor 21005 decodes the attribute data based on the grouped mode difference and the grouped residual difference.

The attribute transform processor (not shown) of the reception device (FIG. 21) may classify and arrange the points acquired by the laser of the same laser ID into the same layer based on the spherical coordinate information about the geometry data. The attribute transform processor (not shown) may be provided as a separate component, or the function thereof may be integrated into the geometry reconstructor 21003 or the predictive/lifting transform processor 21004.

The predictive/lifting transform processor 21004 decodes the attribute data by predictive transform or lifting transform. When the point cloud data is classified into layers, the predictive/lifting transform processor 21004 may decode the attribute data using the predictive transform or the lifting transform method according to the arrangement type of the layers.

The embodiments have been described in terms of a method and/or a device. The description of the method and the description of the device may complement each other.

Although embodiments have been described with reference to each of the accompanying drawings for simplicity, it is possible to design new embodiments by merging the embodiments illustrated in the accompanying drawings. If a recording medium readable by a computer, in which programs for executing the embodiments mentioned in the foregoing description are recorded, is designed by those skilled in the art, it may also fall within the scope of the appended claims and their equivalents. The devices and methods may not be limited by the configurations and methods of the embodiments described above. The embodiments described above may be configured by being selectively combined with one another entirely or in part to enable various modifications. Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the devices of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the device according to the embodiments may include one or more processors capable of executing one or more programs. The one or more programs may perform any one or more of the operations/methods according to the embodiments or include instructions for performing the same.

Executable instructions for performing the method/operations of the device according to the embodiments may be stored in a non-transitory CRM or other computer program products configured to be executed by one or more processors, or may be stored in a transitory CRM or other computer program products configured to be executed by one or more processors.

In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this document, the term "/" and "," should be interpreted as indicating "and/or." For instance, the expression "A/B" may mean "A and/or B." Further, "A, B" may mean "A and/or B." Further, "A/B/C" may mean "at least one of A, B, and/or C." "A, B, C" may also mean "at least one of A, B, and/or C." Further, in the document, the term "or" should be interpreted as "and/or." For instance, the expression "A or B" may mean 1) only A, 2) only B, and/or 3) both A and B. In other words, the term "or" in this document should be interpreted as "additionally or alternatively."

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signal unless context clearly dictates otherwise.

The terminology used to describe the embodiments is used for the purpose of describing particular embodiments only and is not intended to be limiting of the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to be interpreted, when a specific condition is satisfied, to perform the related operation or interpret the related definition according to the specific condition.

Operations according to the embodiments described in this specification may be performed by a transmission/reception device including a memory and/or a processor according to embodiments. The memory may store programs for processing/controlling the operations according to the embodiments, and the processor may control various operations described in this specification. The processor may be referred to as a controller or the like. In embodiments, operations may be performed by firmware, software, and/or combinations thereof. The firmware, software, and/or combinations thereof may be stored in the processor or the memory.

The operations according to the above-described embodiments may be performed by the transmission device and/or the reception device according to the embodiments. The transmission/reception device may include a transmitter/receiver configured to transmit and receive media data, a memory configured to store instructions (program code, algorithms, flowcharts and/or data) for the processes according to the embodiments, and a processor configured to control the operations of the transmission/reception device.

The processor may be referred to as a controller or the like, and may correspond to, for example, hardware, software, and/or a combination thereof. The operations according to the above-described embodiments may be performed by the processor. In addition, the processor may be implemented as an encoder/decoder for the operations of the above-described embodiments.

[Mode for Disclosure]

As described above, related details have been described in the best mode for carrying out the embodiments.

INDUSTRIAL APPLICABILITY

As described above, the embodiments are fully or partially applicable to a point cloud transmission/reception device and system. Those skilled in the art may change or modify the embodiments in various ways within the scope of the embodiments. Embodiments may include variations/modifications within the scope of the claims and their equivalents.

What is claimed is:

1. A method comprising:

encoding geometry data of point cloud data based on a predictive tree; and encoding attribute data of the point cloud data based on a tree structure, wherein the encoding of the geometry data includes reconstructing the geometry data of the point cloud data based on a coding order, wherein the encoding of the attribute data includes reconstructing attribute values in the coding order of a block for the tree structure, wherein the encoding of the attribute data further comprises:

classifying points acquired by lasers having a same laser ID into a same layer based on spherical coordinate information about the point cloud data;

arranging the layer; and encoding the attribute data by a predictive transform or a lifting transform according to the arrangement, wherein the encoded geometry data and the encoded attribute data are included in a bitstream, and wherein the bitstream includes information representing the geometry data is coded using the predictive tree and information for representing a prediction method related to the attribute data.

2. A device comprising:

a memory; and at least one processor connected to the memory, wherein the at least one processor is configured to:

encode geometry data of point cloud data based on a predictive tree; and encode attribute data of the point cloud data based on a tree structure, wherein, to encode the geometry data, the at least one processor is further configured to reconstruct the geometry data of the point cloud data based on a coding order, wherein, to encode the attribute data, the at least one processor is further configured to reconstruct attribute values in the coding order of a block for the tree structure, wherein, to encode the attribute data, the at least one processor is further configured to:

classify points acquired by lasers having a same laser ID into a same layer based on spherical coordinate information about the point cloud data;

arrange the layer; and encode the attribute data by a predictive transform or a lifting transform according to the arrangement, wherein the encoded geometry data and the encoded attribute data are included in a bitstream, and wherein the bitstream includes information representing the geometry data is coded using the predictive tree and information for representing a prediction method related to the attribute data.

3. A method comprising:

decoding geometry data of point cloud data in a bitstream based on a predictive tree; and decoding attribute data of the point cloud data based on a tree structure, wherein the decoding of the geometry data includes reconstructing the geometry data of the point cloud data based on a coding order, wherein the decoding of the attribute data includes reconstructing attribute values in the coding order of a block for the tree structure, wherein the decoding of the attribute data further includes:

classifying points into layers based on spherical coordinate information about the geometry data of the point cloud data;

arranging the layers; and decoding the attribute data by a predictive transform or a lifting transform according to the arrangement, wherein the bitstream includes information representing the geometry data is coded using the predictive tree and information for representing a prediction method related to the attribute data.

4. A device comprising:

a memory; and at least one processor connected to the memory, wherein the at least one processor is configured to:

decode geometry data of point cloud data in a bitstream based on a predictive tree; and decode attribute data of the point cloud data based on a tree structure, wherein, to decode the geometry data, the at least one processor is further configured to reconstruct the geometry data of the point cloud data based on a coding order, wherein, to decode the attribute data, the at least one processor is further configured to reconstruct attribute values in the coding order of a block for the tree structure, wherein, to decode the attribute data, the at least one processor is further configured to:

classify points into layers based on spherical coordinate information about the geometry data of the point cloud data;

arrange the layers; and decode the attribute data by a predictive transform or a lifting transform according to the arrangement, wherein the bitstream includes information representing the geometry data is coded using the predictive tree and information for representing a prediction method related to the attribute data.

* * * * *